US011526884B2

(12) United States Patent
Chilaka et al.

(10) Patent No.: US 11,526,884 B2
(45) Date of Patent: Dec. 13, 2022

(54) MOBILE DEVICE VERIFICATION FOR AN ELECTRONIC APPLICATION BEFORE PROVIDING A DIGITAL PASS TO AN APPROVED CUSTOMER

(71) Applicant: BREAD FINANCIAL PAYMENTS, INC, Columbus, OH (US)

(72) Inventors: Uchenna Chilaka, Blacklick, OH (US); Timothy Jones, Westerville, OH (US); Timothy D. Pontious, Gahanna, OH (US); Celeste Rechner, Upper Arlington, OH (US)

(73) Assignee: BREAD FINANCIAL PAYMENTS, INC, Columbus, OH (US)

( * ) Notice: Subject to any disclaimer, the term of this patent is extended or adjusted under 35 U.S.C. 154(b) by 0 days.

(21) Appl. No.: 16/734,118

(22) Filed: Jan. 3, 2020

(65) Prior Publication Data
US 2021/0117969 A1    Apr. 22, 2021

Related U.S. Application Data

(60) Provisional application No. 62/924,605, filed on Oct. 22, 2019.

(51) Int. Cl.
*G06Q 20/40* (2012.01)
*G06Q 20/10* (2012.01)
(Continued)

(52) U.S. Cl.
CPC ............ *G06Q 20/40* (2013.01); *G06Q 20/10* (2013.01); *G06Q 20/322* (2013.01); *G06Q 20/36* (2013.01); *H04L 63/08* (2013.01)

(58) Field of Classification Search
CPC .................................................... G06Q 20/40
See application file for complete search history.

(56) References Cited

U.S. PATENT DOCUMENTS

| 2015/0262291 A1* | 9/2015 | West | G06Q 30/0269 |
| | | | 705/14.66 |
| 2016/0098700 A1* | 4/2016 | Johnson | G07F 9/001 |
| | | | 705/43 |

(Continued)

FOREIGN PATENT DOCUMENTS

CA       2974817 A1 *  2/2018  ....... G06F 17/30867

OTHER PUBLICATIONS

"Thanh, Security issues in Mobile eCommerce, Aug. 6, 2002, IEEE Xplore, entire document" (Year: 2002).*

*Primary Examiner* — Hani M Kazimi
*Assistant Examiner* — Adam Hilmantel

(57) ABSTRACT

A system and method for mobile device verification for an electronic application before providing a digital pass to an approved customer is disclosed. The method and system receives, at a store's customer credit application computer, an application for a new account, the application including a contact information for a customer's mobile device providing, from the store's customer credit application computer, the contact information for the customer's mobile device to a verification system to authenticate the customer's mobile device providing, from a credit account provider, a text to the customer's mobile device, the text causing the customer's mobile device to be subjected to a second authentication; receiving, at the customer's mobile device, a message that includes a link to the digital pass; and utilizing the link to receive the digital pass at a mobile wallet of the customer's mobile device.

18 Claims, 12 Drawing Sheets

(51) Int. Cl.
  *G06Q 20/36*  (2012.01)
  *H04L 9/40*  (2022.01)
  *G06Q 20/32*  (2012.01)

(56) References Cited

U.S. PATENT DOCUMENTS

| | | | | |
|---|---|---|---|---|
| 2016/0155191 A1* | 6/2016 | Walz | ................ | G06Q 40/025 |
| | | | | 705/14.36 |
| 2016/0189152 A1* | 6/2016 | Walz | ................ | H04N 1/32144 |
| | | | | 705/14.27 |
| 2017/0317997 A1* | 11/2017 | Smith | ................ | G06Q 20/3829 |
| 2018/0053252 A1* | 2/2018 | Koltnow | ............. | G06Q 40/025 |
| 2018/0287790 A1* | 10/2018 | Everett | ............. | H04L 63/0823 |
| 2018/0300724 A1* | 10/2018 | Vokes | ................ | G06Q 10/00 |

\* cited by examiner

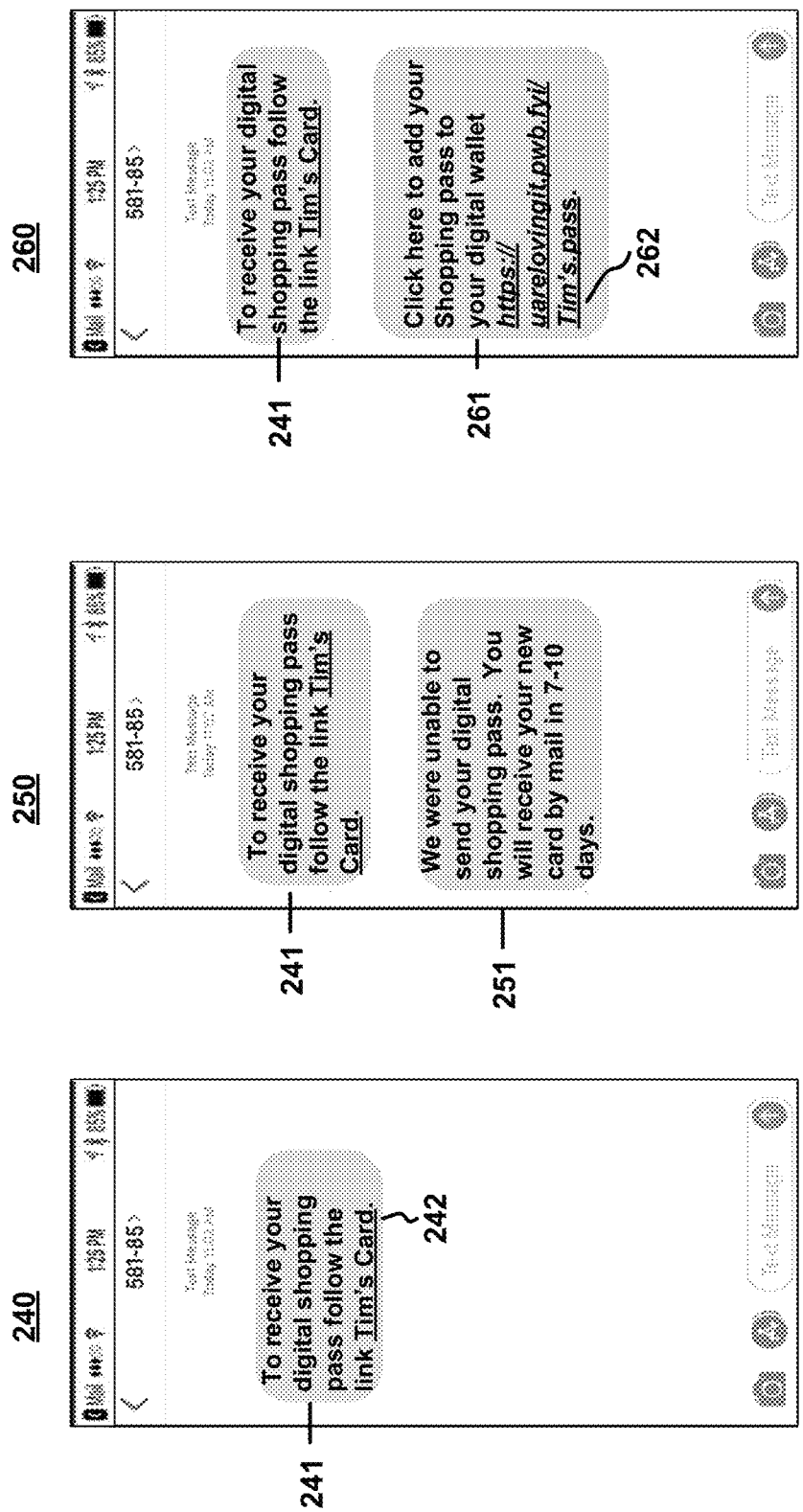

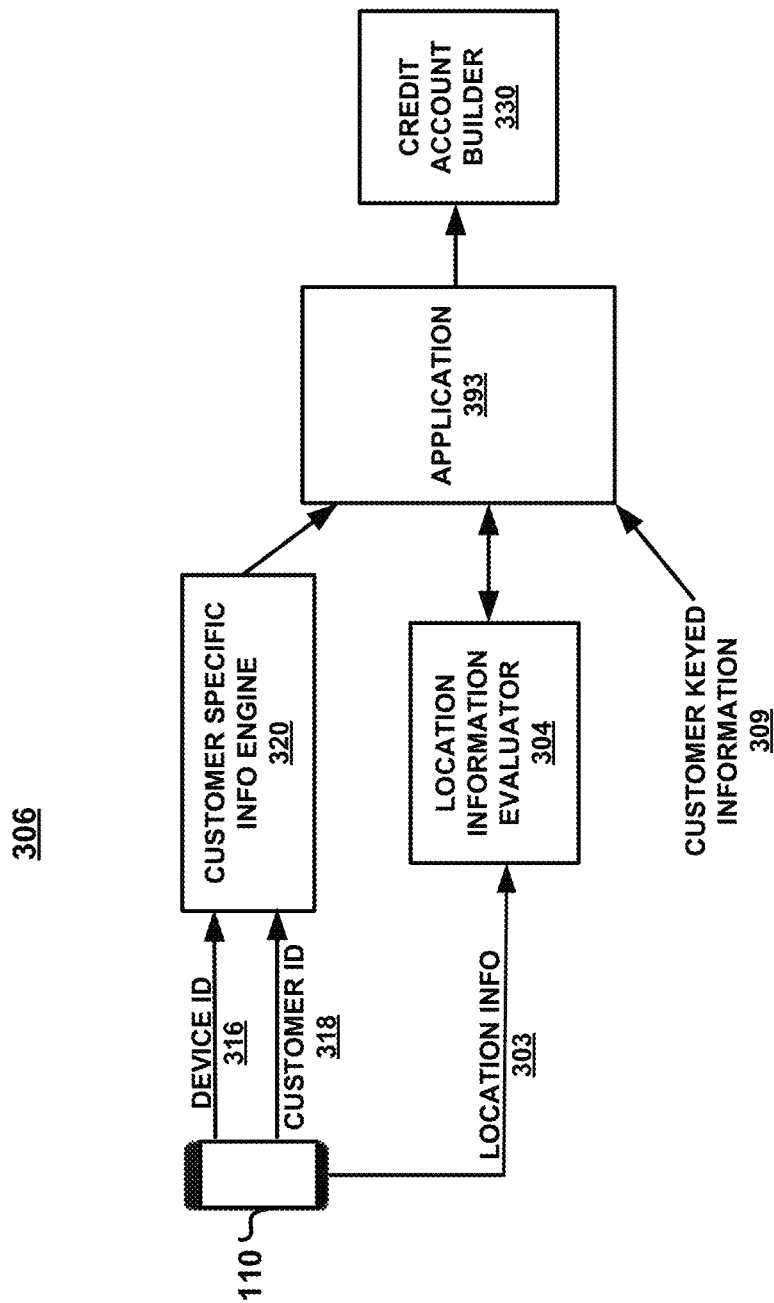

MOBILE DEVICE VERIFICATION FOR AN ELECTRONIC APPLICATION BEFORE PROVIDING A DIGITAL PASS TO AN APPROVED CUSTOMER

CROSS-REFERENCE TO RELATED APPLICATIONS (PROVISONAL)

This application claims priority to and benefit of U.S. Provisional Patent Application No. 62/924,605 filed on Oct. 22, 2019 entitled "MOBILE DEVICE VERIFICATION FOR AN ELECTRONIC APPLICATION BEFORE PROVIDING A DIGITAL PASS TO AN APPROVED CUSTOMER" by Chilaka et al., and assigned to the assignee of the present application, the disclosure of which is hereby incorporated by reference in its entirety.

BACKGROUND

Company specific and brand specific credit cards provide significant value to customer, brand and issuer. By issuing a brand specific credit card, the brand and issuer are able to tailor rewards offers, provide loyalty discounts and maintain and promote customer brand loyalty. Similarly, the customer receives the perks from the reward offers, the loyalty discounts and often provides good word provider recommendations via word of mouth, social networks, internet rating sites, and the like.

Moreover, since the procedure is Internet-centric and at least a portion of credit from the digital pass for the new credit account is often available almost immediately, the ability to detect and deter fraud in the electronic realm is a continuing challenge.

BRIEF DESCRIPTION OF THE DRAWINGS

The accompanying drawings, which are incorporated in and form a part of this specification, illustrate various embodiments and, together with the Description of Embodiments, serve to explain principles discussed below. The drawings referred to in this brief description should not be understood as being drawn to scale unless specifically noted.

FIG. 2E is a screen capture of a verification text sent to a customer's mobile device that includes a link to request the digital card, in accordance with an embodiment.

FIG. 2F is a screen capture of a verification failure sent to the customer's mobile device, in accordance with an embodiment.

FIG. 2G is screen capture of a text including instructions and a link for putting the new account into the customer's mobile wallet sent to the customer's mobile device, in accordance with an embodiment.

FIG. 3A is a block diagram of a system to pre-populate and verify information on a credit application, in accordance with an embodiment.

DESCRIPTION OF EMBODIMENTS

Figure 1A:
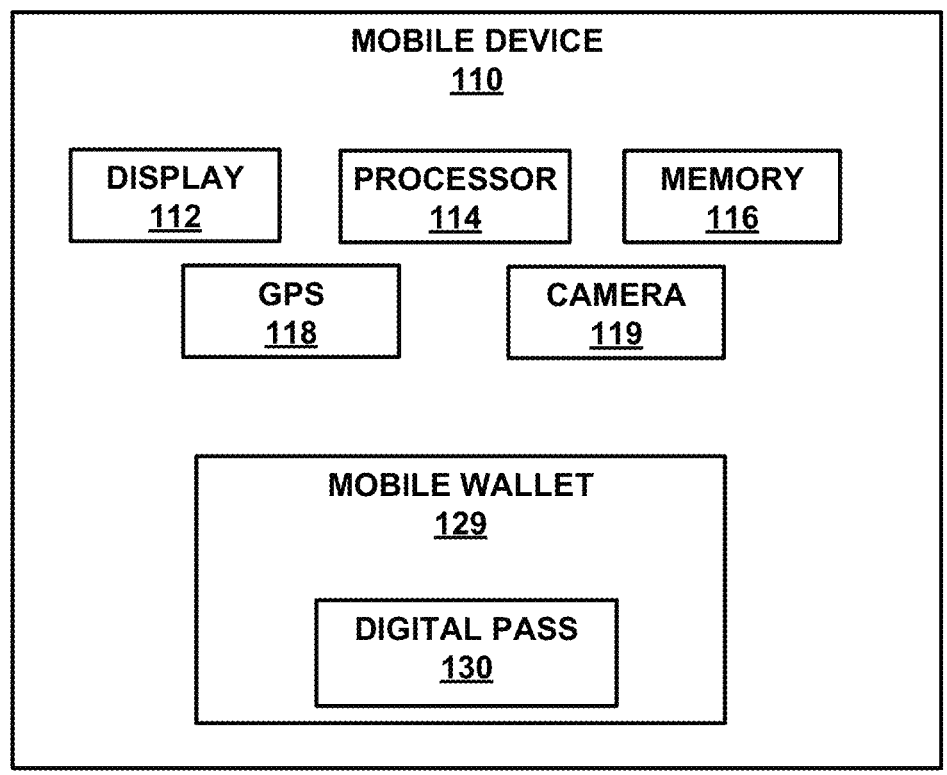
FIG. 1A is a block diagram of a mobile device, in accordance with an embodiment.

Reference will now be made in detail to embodiments of the subject matter, examples of which are illustrated in the accompanying drawings. While the subject matter discussed herein will be described in conjunction with various embodiments, it will be understood that they are not intended to limit the subject matter to these embodiments. On the contrary, the presented embodiments are intended to cover alternatives, modifications and equivalents, which may be included within the spirit and scope of the various embodiments as defined by the appended claims. Furthermore, in the Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Notation and Nomenclature

Unless specifically stated otherwise as apparent from the following discussions, it is appreciated that throughout the present Description of Embodiments, discussions utilizing terms such as "selecting", "outputting", "inputting", "providing", "receiving", "utilizing", "obtaining", "updating", "accessing", "changing", "deciding", "determining", "interacting", "searching", "pinging" or the like, often refer to the actions and processes of an electronic computing device/system, such as a desktop computer, notebook computer, tablet, mobile device, and electronic personal display, among others. The electronic computing device/system manipulates and transforms data represented as physical (electronic) quantities within the circuits, electronic registers, memories, logic, and/or components and the like of the electronic computing device/system into other data similarly represented as physical quantities within the electronic computing device/system or other electronic computing devices/systems.

An integrated credit application refers to an application for a credit account that is integrated with the point of sale (POS), such as at the register at the time of purchase or during a checkout procedure, where the resultant credit account is available to use at the time of application/checkout at the POS.

A non-integrated credit application refers to an application for a credit account that is not integrated with the POS, such as at the register at the time of purchase or during a checkout procedure, where the resultant credit becomes available for customer use when the credit card arrives after a given number of days. E.g., such as by mail, etc.

A brand specific credit account refers to a credit account that is available for use only at locations related to the brand. E.g., Tim's store has a brand specific credit account that allows Celeste, a Tim's store customer, to purchase with credit at Tim's store using Tim's brand specific credit account. However, Celeste cannot use the Tim's brand specific credit account to make purchases at her local gas station. A brand specific credit account may also be referred to as a private label card, e.g., a card that can be used for purchases only at the store on the label.

A co-branded card refers to a card that has a store on the label as well as an underlying credit card network with an accompanying logo (e.g., Visa™, Mastercard™, etc.). As such, a co-branded card may be used for purchases at the store on the label as well as at other stores that accept that credit card network's credit cards.

Importantly, the embodiments of the present invention, as will be described herein, automatically perform a mobile device verification of a customer before providing a digital card to the customer. For example, the electronic application is completed and filed by the store's computing device. After the application is filed and approved, a secondary verification of the customer is performed by reviewing the customer's contact information and send a verification to the customer's verified contact information (e.g., the customer's mobile device). Since the mobile device verification is performed both on the customer's submitted mobile device contact information and then sent to the customer's mobile device with a second verification, the customer has been vetted two or three times before they are able to receive (or access) the teomporary credit account.

Thus, embodiments of the present invention provide a mobile device verification which is completely different than what was previously done because of the Internet-centric aspect of the application that can be accessed on the store computing device, completed at the store computing device, and presented to the credit account provider for credit account determination. The credit account provider can review the customer contact information and once that is verified, they can send the mobile device verification to the customer's mobile device. Upon receipt, the customer's mobile device is again verified before the temporary pass is provided to the customer's mobile device for utilization.

As such, the various embodiments of the present invention do not merely implement conventional verification processes on a computer. Instead, the various embodiments of the present invention, in part, provide a previously unknown, unavailable, and unnecessary procedure for including a secondary (and even tertiary) verification of the customer and the customer's mobile device. Moreover, one embodiment further performs a fraud location evaluation using a location and a distance between the customer's mobile device and the location of the store's customer credit application computer, and/or the actual store location. In so doing, embodiments provide a new and novel way of authenticating a customer's mobile device as a part of a secondary verification while also performing a repeatable fraud risk determination. Hence, embodiments of the present invention provide a novel process for determining fraud before a customer can even obtain an electronic credit account which is necessarily rooted in Internet-centric computer technology to overcome a problem specifically arising in the realm of application fraud via electronic applications.

In addition, the solution provides a limited use, time constrained, credit limit reduced, stop-gap temporary credit account capability which differs significantly from the conventional processes for providing a credit account in an integrated solutions whereby the customer receives a printout from the register that has their account number on it, and the customer can use the information on the receipt until the card arrives. Such printout approaches provide an account number on the receipt that can be lost, misplaced or otherwise found by another party that will then have the account number and information available to make purchases in numerous locations until the card is identified as lost/stolen. Because a customer is not used to worrying about information on a receipt being the full credit card information, the risk of loss is higher. Further, since the receipt includes the actual account information, if it is lost, there can be a significant amount of fraudulent charges, up to and possibly beyond the credit limit, before the loss is identified.

Thus, the various embodiments of the present invention do not merely implement conventional electronic credit account processes on a computer. Instead, the various embodiments of the present invention, in part, provide a procedure that was impossible in pre-networked device for reducing fraud by further providing a limited use, time constrained, stop-gap credit capability that allows a customer to make an initial purchase, after applying for a credit account, while also providing a reduced risk to the credit account provider. Thus, embodiments of the present invention provide a novel stop-gap measure which extends well beyond what was previously available.

Moreover, the embodiments do not recite a mathematical algorithm; nor do they recite a fundamental economic or longstanding commercial practice. Instead, they address a business challenge that has been born in the Internet-centric environment of electronic application fraud mitigation. Thus, the embodiments do not "merely recite the performance of some business practice known from the pre-Internet world along with the requirement to perform it on the Internet." Instead, the embodiments are necessarily rooted in network-centric environments in order to overcome a problem specifically arising in the realm of electronic application fraud mitigation.

Operation

Referring now to FIG. 1A, a block diagram of a mobile device 110 is shown. Although a number of components are shown as part of mobile device 110, it should be appreciated that other, different, more, or fewer components may be found on mobile device 110.

In general, mobile device 110 is an example of any or all of a customer's mobile device, a store's mobile device, or the like. Mobile device 110 could be a mobile device, a smart phone, a tablet, a smart watch, a piece of smart jewelry, smart glasses, or other customer portable devices having wireless connectivity. For example, mobile device 110 is capable of broadcasting and receiving via at least one network, such as, but not limited to, WiFi, Cellular, Bluetooth, NFC, and the like. In one embodiment, mobile device 110 includes a display 112, a processor 114, a memory 116, a GPS 118 (or other position determination system), a camera 119, and the like.

In general, GPS 118 can generate and provide location information with respect to the customer's mobile device. The output from GPS 118 could be utilized by an operating system of mobile device 110, an application (app) loaded on mobile device 110, a web based app accessed over a network by mobile device 110, or the like. In one embodiment, the output from GPS 118 could be provided to another computing system for identification purposes, fraud determination/ evaluation, etc. In one embodiment, instead of providing GPS information, the location of mobile device 110 may be determined within a given radius, such as the broadcast range of an identified WAP, a WiFi hotspot, overlapped area covered by a plurality of mobile telephone signal providers, or the like. In one embodiment, instead of providing GPS information, the location of mobile device 110 may be determined within a given radius, such as the broadcast range of an identified wireless access point, a WiFi hotspot, the known location of a device as identified by the device's serial number, a media access control (MAC) address, an Internet protocol (IP) address, a universal unique identifier (UUID), a model number, a product number, or the like.

Mobile device 110 also includes a mobile wallet 129 which is an electronic application that operates on mobile device 110. Mobile wallet 129 includes digital pass 130. In general, digital pass 130 is a payment method that is linked to the new credit account and carried in a secure digital form on a mobile device 110. Instead of using a physical plastic card to make purchases, a mobile wallet allows a customer to pay via mobile device 110 in stores, in apps, or on the web.

Figure 1B:
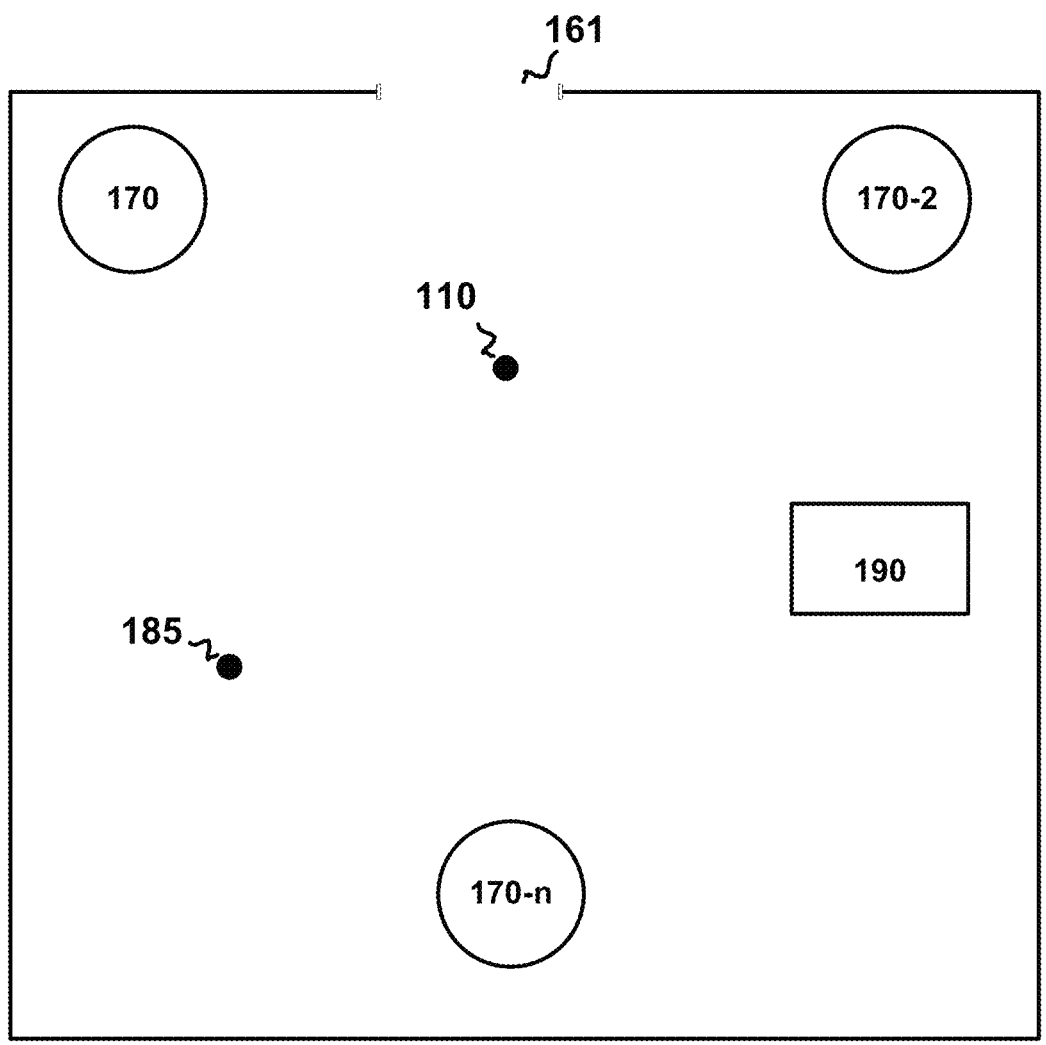
FIG. 1B is a block diagram of an embodiment of a retail establishment having one or more location identifying electronic capabilities, in accordance with an embodiment.

Referring now to FIG. 1B, a top plan view of a store 155 is shown in accordance with an embodiment. In general, store 155 is any physical brick and mortar store that provides goods for sale. In one embodiment, store 155 includes an entrance 161 and a point of sale (POS) 190. In addition, in different embodiments and configurations, store 155 can include one or more wireless access points 170 through 170-n (referred to hereinafter collectively as "WAP 170"), and a store's customer credit application computer 185 (hereinafter "device 185").

In one embodiment, device 185 is an example computer system (such as computer system 7) used in accordance with various embodiments. In general, device 185 could be a desktop computing device, a terminal, a server, a portable device (such as a laptop, tablet, etc.), a mobile device (such as those described herein), or the like. In one embodiment, device 185 is a fixed location computing device located, for example, at a Kiosk. In another embodiment, device 185 is a mobile device that can be moved about the store 155. It should be appreciated that device 185 is not strictly limited to be a computer system. Instead, device 185 is well suited to be any type of computer device (e.g., server computer, portable computer device, desktop computer, mobile device, etc.). Within the present discussions, certain processes and steps are discussed that are realized, in one embodiment, as a series of instructions (e.g., software program) that reside within computer readable memory units and executed by a processor(s) of device 185. When executed, the instructions cause device 185 to perform specific actions and exhibit specific behavior that may be described in detail herein. For example, device 185 may be used to implement aspects of methods described herein.

The one or more of WAP 170 are devices such as, but not limited to, beacons, hotspots, transmitters, receivers, and the like that utilize RFID, Bluetooth, NFC, WiFi, and the like to communicate with other computing systems such as device 185, mobile device 110, POS 190, and the like. In one embodiment, WAP 170 can also be an indoor positioning system or the like.

Figure 2B:
FIG. 2B is a screen capture of an application requesting the verification of found customer information as depicted on the display of the store's customer credit application computer, in accordance with an embodiment.
Figure 2A:
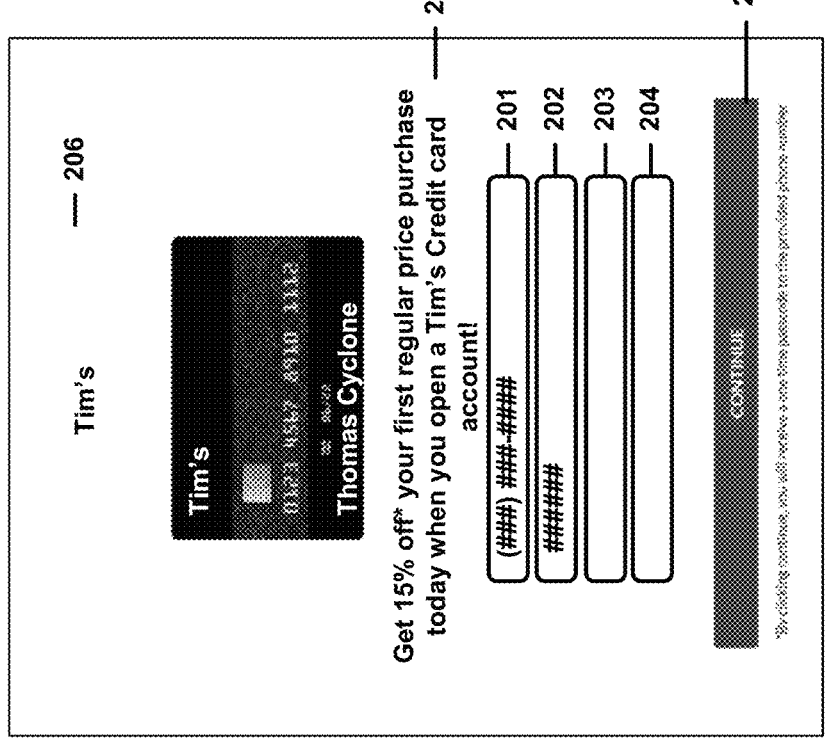
FIG. 2A is a screen capture for the application process using a store's customer credit application computer, in accordance with an embodiment.

FIG. 2A is a screen capture of the application page 200 presented on device 185, in accordance with an embodiment. Although, as stated above, the interaction could be with one or more of the store's devices, the following example will refer to the interaction occurring at device 185 for purposes of clarity.

In one embodiment, application page 200 includes a brand 206 (Tim's) and an offer 207 to open a new credit account. The application includes a request for a mobile device number 201, some or all of the customer's SSN 202, and may have optional requests 203, 204, and the like. In one embodiment, the optional information request could be a birthdate, a zip code, a home address, any of the user ID information, any of the device ID information, and the like. Although a number of different requests are made, it should be appreciated that more or fewer questions may be initially requested by the application on web page 200. Although the screen captures shown in FIGS. 2A-2G include a number of different statements, requests, and provisions, it should be appreciated that more or fewer questions may be initially requested by the application on page 200 (and on any or all of FIGS. 2A-2G). The information in the Figures is provided as one embodiment, and may be modified by the credit account provider, the store, or the like.

Further, there may be a second (or any number of) page similar to FIG. 2A that could include an additional information request. For example, if the initially requested information was phone number and address, if a number of parties are at that address and linked to that phone number, there would be a need to ask for an additional identifier such as a birthday.

For example, if two spouses (or parent/child, siblings, etc.) both lived at the same address and the mobile number was shared by both spouses, there may be a need to ask a further identifying question in order to determine which spouse is applying.

In one embodiment, the info requests 201-202 are based upon an evaluation of which information would provide the best capability for fraud prevention as discussed in further detail herein.

In one embodiment, the application process is initiated by a customer interacting with device 185 such as via a keyboard, touchscreen, mouse, voice, or other input capability. In another embodiment, the application process is initiated by a device-to-device communication between the customer's mobile device and device 185.

In one embodiment, the device-to-device communication between the customer's mobile device and device 185 can include, for example, a data exchange. In one embodiment, the data exchange could be as little as the customer's mobile device 110 phone number. In another embodiment, the data exchange could include any amount of customer identifier 218 and mobile device identifier 216 information.

In one embodiment, the device-to-device communication triggers a process to initiate the electronic credit application for the new credit account on device 185. For example, the initiating of the process could be the opening of a web page on device 185 to the electronic credit application for the new credit account, a queuing up of the electronic credit application for the new credit account on a display of device 185, or the like.

In one embodiment, device 185 will interface with a cache or a memory store on the customer's mobile device 110 to obtain at least a portion of the customer identification information thereon, and then prefills at least a portion of the electronic credit application for the new credit account with the obtained customer identification information.

In another embodiment, some or all of the customer information can be obtained and prefilled in the credit application using customer look-up methods and customer data acquisition from other databases such as described herein. For example, the customer information in the application will include pre-filled customer information 323 obtained by customer specific info engine 320 as described in detail in the discussion of FIGS. 3A-3C herein. For example, in one embodiment, the information such as name, address, city, state, phone number, email and the like, would be prefilled. Thus, instead of having to type in the information, the customer would simply verify that the information is correct and make any changes accordingly. Similarly, if some of the information was missing, the customer would be able to fill in only the missing portions without having to complete the entire form. Thus, the customer would see a significant number of keystroke reduction in the pre-filled forms which would increase throughput, decrease frustration and the time needed to fill out the forms.

FIG. 2B is a screen capture 210 of an application requesting the verification of customer information as depicted on the display of the device 185, in accordance with an embodiment. The customer can confirm 211 that the information is correct, and that information will then be used to prepopulate the credit application 393 as described herein.

Figure 3B:
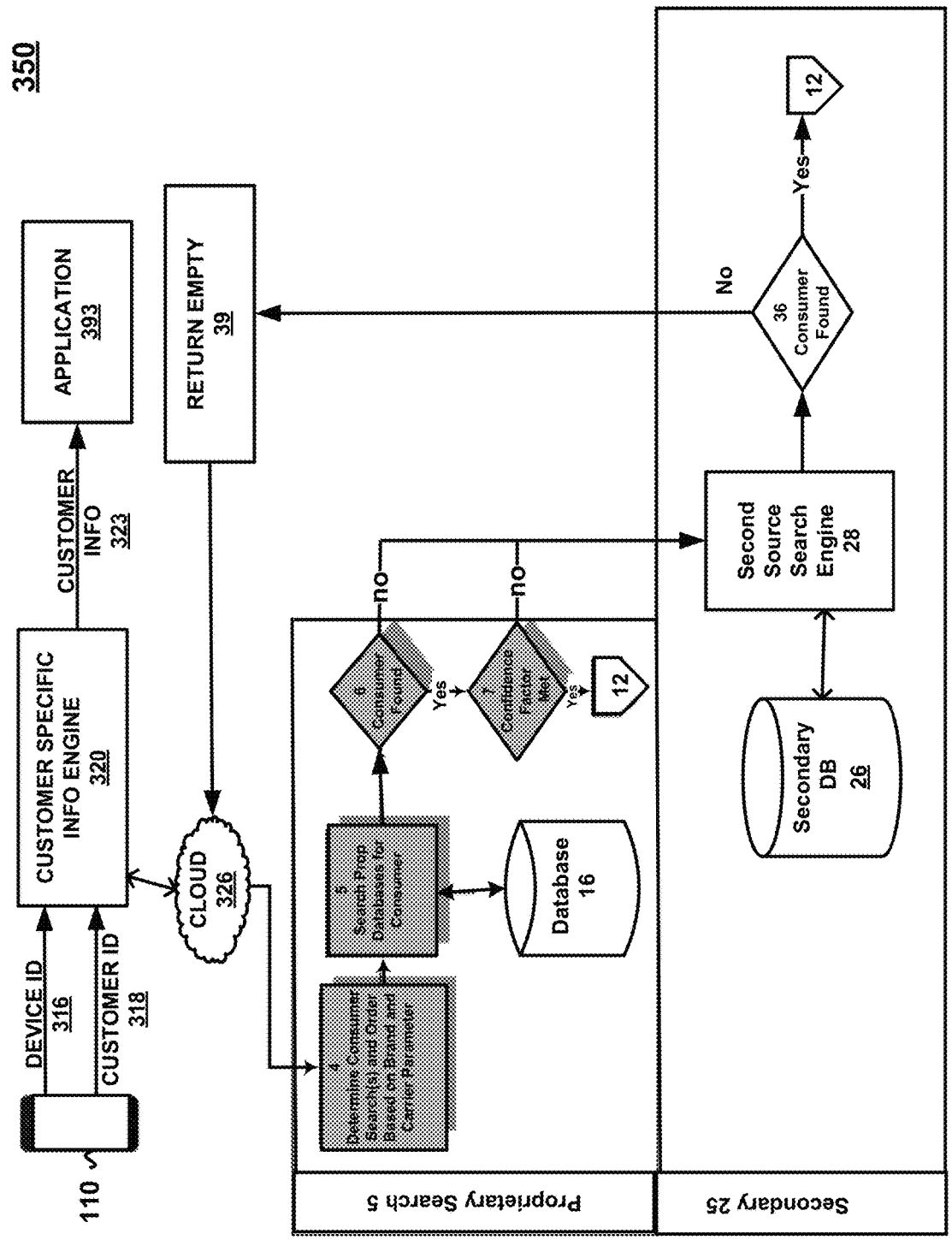
FIG. 3B is a block diagram of a customer specific information engine accessing one or more different search locations, in accordance with an embodiment.
Figure 3C:
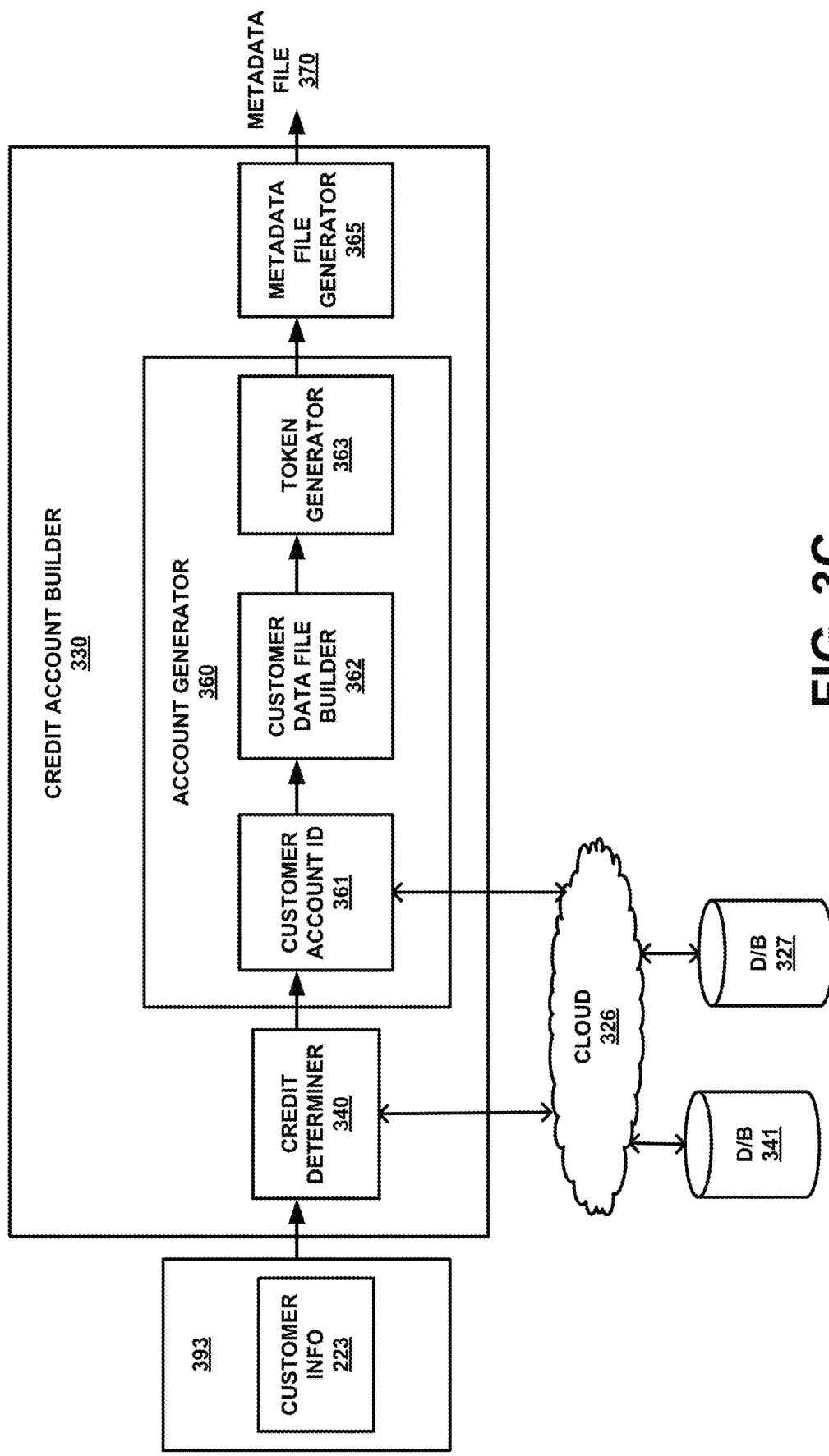
FIG. 3C is a block diagram of a system for adding a digital pass with purchase capability to a mobile wallet, in accordance with an embodiment.

In one embodiment, some or all of the customer information provided by the customer is verified using customer look-up methods and customer data acquisition from other databases such as customer information 323 obtained by customer specific info engine 320 as described in detail in the discussion of FIGS. 3A-3C herein. In one embodiment, the customer provided information such as name, address, city, state, phone number, email and the like, would be validated by the found customer information 323. Similarly, the information on the application would be run through the fraud determination as described in detail in FIG. 5. Thus, the information in the application would be verified during the application process and prior to approval.

Figures 2C, 2D:
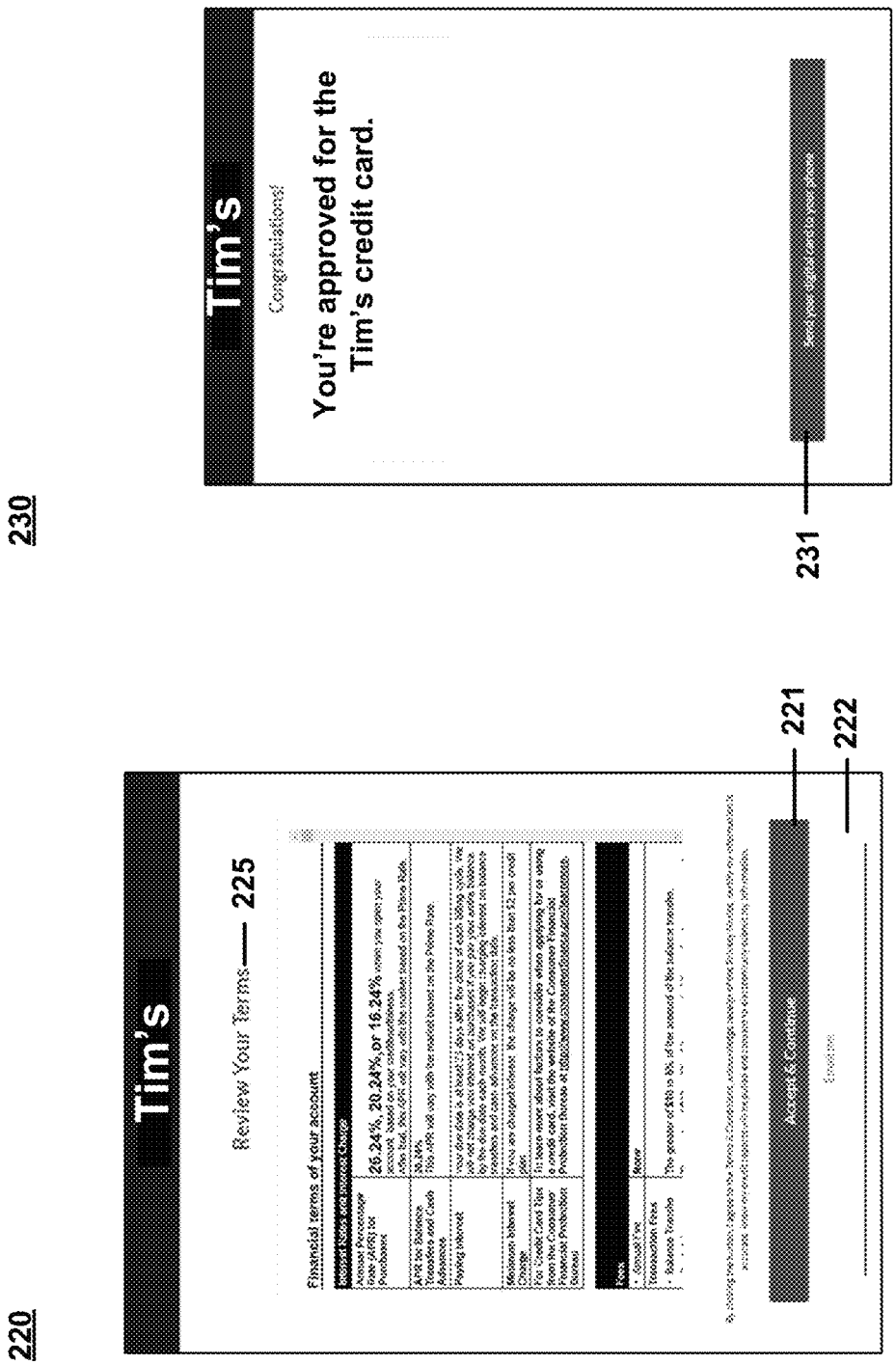
FIG. 2C is a screen capture of an application providing the terms and conditions as depicted on the display of the store's customer credit application computer, in accordance with an embodiment.
FIG. 2D is a screen capture of an application approval as depicted on the display of the store's customer credit application computer, in accordance with an embodiment.

FIG. 2C is a screen capture 220 of an application providing the terms and conditions 225 as depicted on the display of device 185, in accordance with an embodiment. The customer can choose to accept and continue 221 and/or receive an email 222 that includes the information. In one embodiment, the terms and conditions 225 would include a signature portion. Once the customer signed and submitted the terms and conditions 225, the customer would then be presented with the new account information as shown in FIG. 2D.

FIG. 2D is a screen capture 230 of an application approval as depicted on the display of device 185, in accordance with an embodiment. As stated herein, the approval will be based on the actions of one or more of the components of FIGS. 3A-5 as described herein. At FIG. 2D, the customer can select the link 231 to send the digital card to the customer's mobile device 110.

In one embodiment, when the customer selects the link the customer's phone number (or other device identifier) is provided to a customer specific info engine 320 as shown and discussed in the description of FIGS. 3A-3C. Customer specific info engine 320 is used to authenticate the customer's mobile device (e.g., the mobile phone number, or the like).

In one embodiment, if at FIG. 2D the customer is approved, is authenticated and receives the message with the link 231 but does not choose to select the link 231 to send the digital card to the customer's mobile device 110, the customer's phone number (or other device identifier) is still provided to a customer specific info engine 320 and is still evaluated for authentication and verification. In one embodiment, the passing or failing of the authentication of the customer's mobile device is displayed on device 185.

FIG. 2E is a screen capture 240 of a verification text 241 sent to a customer's mobile device 110 that includes a link 242 to request the digital card in accordance with an embodiment. In one embodiment, the verification text 241 is sent in response to the customer selecting the link 231 to send the digital card to the customer's mobile device 110.

In one embodiment, the link 242 will direct the customer to a microsite that will provide a second level of validation to the customer's mobile device. In one embodiment, the microsite is agnostic to application capabilities, integration method (ADS hosted or client managed), and device (device 185 or customer device). For example, the microsite could be a site such as described in FIGS. 3A-5 that would provide a likelihood that phone number(s) associated with the customer is valid. In one embodiment, another system or outside vendor is used to perform the validation/fraud mitigation process.

If the customers mobile device is not authenticated, then, in one embodiment, such as shown in FIG. 2F, a screen capture 250 of a verification failure text 251 is sent to the customer's mobile device 110. The verification failure text 251 could be information that lets the customer know they will be receiving their new card by mail in 7-10 days.

However, if the customers mobile device is authenticated, a verification text 261 (e.g., SMS, email, app message, or the like) is sent to the customer's mobile device 110 as shown in FIG. 2G. In one embodiment, the verification text 261 will include instructions and a link 262 which for adding the digital pass 130 for the new credit account to the mobile wallet 129 of the customer's mobile device 110. In another embodiment, the digital pass 130 can be added to an application or other location on the customer's mobile device 110.

In one embodiment, if the customer is approved, is authenticated and does not receive the SMS message 261 with the link 262 to their digital pass due to an error from the validation system, no message is displayed on the mobile device or on device 183. In one embodiment, if the customer is approved and is not authenticated, an error message such as message 251 is displayed on the approval page (e.g., FIG. 2D) of device 183.

Figure 6:
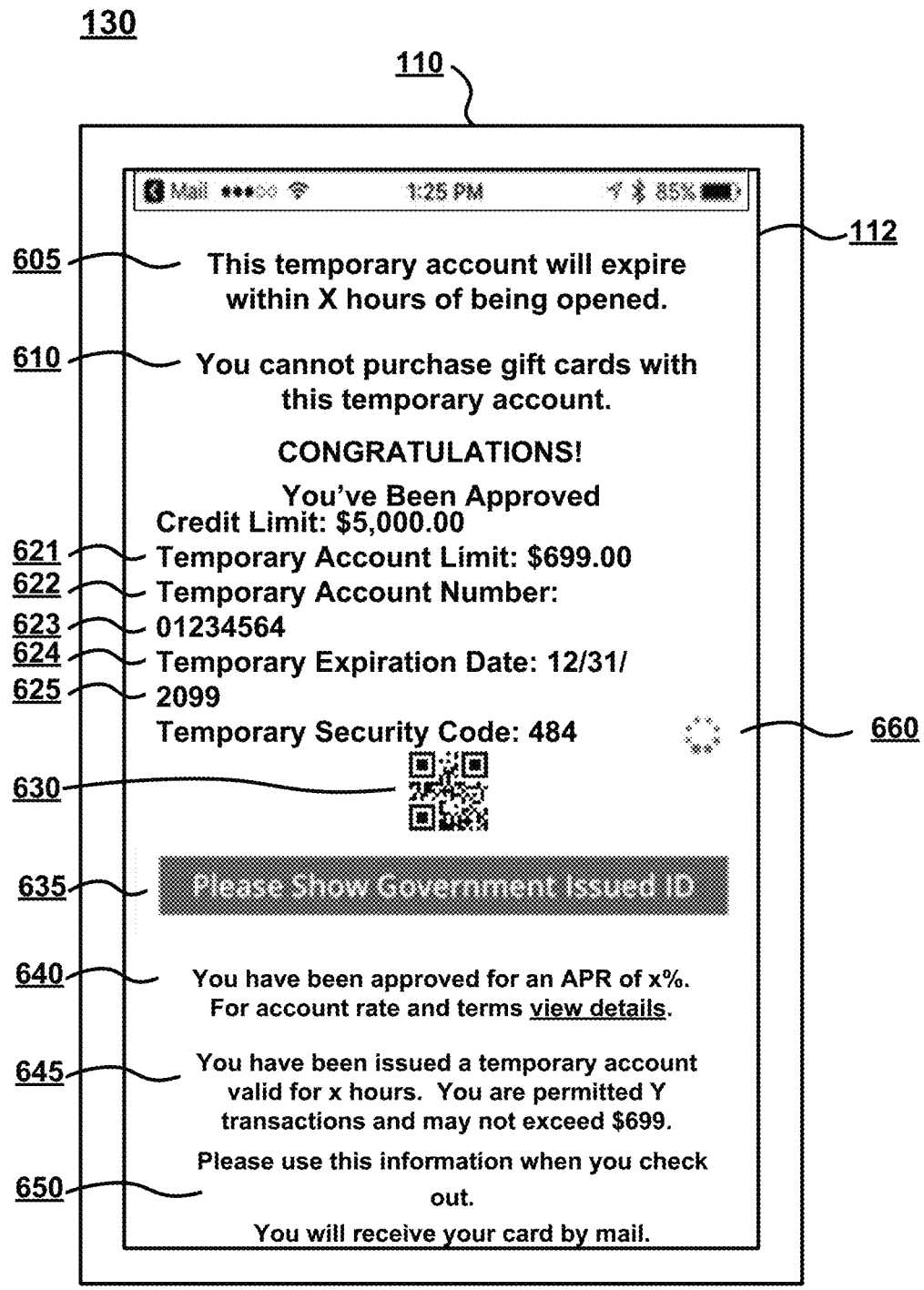
FIG. 6 depicts a block diagram of a limited use temporary credit account presented on a display screen of a mobile device, in accordance with an embodiment.

In one embodiment, if the digital pass in device 183 expires, as long as the device token has not expired, a session expiration message displayed with 'Retrieve Pass" button is displayed on the approval page (e.g., FIG. 2D) of device 183. In one embodiment, the customer can click the 'Retrieve Pass' button displayed on the approval page (e.g., FIG. 2D) of device 183. The customer will then need to enter correct authentication data and will be able to retrieve a new digital pass as shown in FIG. 6.

In one embodiment, if the digital pass in device 183 expires, and the device token has expired, a session expiration message displayed with 'Retrieve Pass" button is displayed on the approval page (e.g., FIG. 2D) of device 183. In one embodiment, the customer can click the 'Add to Wallet' button on the digital pass and the digital pass is displayed on the customer's mobile device 110, the customer can then select an 'Add' button and the digital pass will be saved in mobile wallet app.

With reference now to FIG. 3A, a block diagram of a system 306 for obtaining and/or verifying information on a credit application 393 is shown in accordance with an embodiment. System 306 includes a mobile device 110, location information 303, customer keyed information 309, location information evaluator 304, customer specific information engine 320, and application 393. In general, application 393 is an application for a credit account, a reward account, or the like, a credit account increase, or the like.

In one embodiment, the location information 303 could be the location of the mobile device. In one embodiment, the location of the mobile device can be determined via geo-fence, WAP range, a ping, NFC, WiFi, or the like. Moreover, the location may be an actual location or a relative location.

For example, actual location information may be obtained by the customer's mobile device location services, such as but not limited to, GPS, WiFi, cellular service, WAP derived location determination, and the like. Moreover, the location determination can be useful even at differing levels of accuracy. For example, a GPS enabled mobile device would provide location information that is accurate to within a few meters and would be lat long coordinates (or similar).

In contrast, relative location information is location information determined via a broadcasting or receiving station (e.g., cellular service, WAP, hotspot, or the like). The relative location would be the location of the station and a broadcast radius (or area) of coverage for the station. Moreover, if the device is picked up by two or more different stations, then the location could be further refined as being within the overlapping broadcast radii of the number of different stations. For example, although the actual location of the mobile device may not be known, if the mobile device is interacting with a WAP 170-2, then the relative location of the mobile device would have to be in range of WAP 170-2 broadcast radius. Similarly, a geo-fence could be used to determine that the location of the mobile device is within the defined geo-fenced area, although the actual location of the mobile device within the geofenced area may not be known.

In one embodiment, mobile device 110 will use a positioning determining system such as GPS 118, a location app operating thereon, or the like to determine location information 303. In another embodiment, the mobile device may be able to determine a location within a given radius, such as the broadcast range of a WAP, WiFi hotspot, overlapped area covered by a plurality of mobile device signal providers, or some combination thereof.

Location information 303 refers to the location of the mobile device 110 at different times of the day as generated by a positioning system on the mobile device 110, by location information on the customer's home computer system or the like. Because of the different positioning systems available on a mobile device, the location information 303 can include differing levels of accuracy. For example, a GPS enabled mobile device 110 can provide location information 303 that is accurate to within a few meters or less. In contrast, location information 303 derived from cellular service, WAP, WiFi location capabilities, and the like can provide a location radius or location area that may be within 10-50 meters or even larger.

Location information evaluator 304 uses location information 303 to determine an actual address. For example, in one embodiment, the location information 303 provided by mobile device 110 are provided as coordinates data. In order to determine an address, location information evaluator 304 cross-references the coordinate data with one or more different coordinate-to-address determination sources such as: mapping software, surveyor data that includes business and/or residential information, County assessor's information, or other coordinate-to-address determiners. Further operation of location information evaluator 304 is shown and described in FIG. 5.

Customer specific information engine 320 receives a device ID 316 and/or a customer ID 318 information and utilizes some or all of the information to obtain customer specific information to prepopulate application 393. The operation of customer specific information engine 120 is discussed in more detail in the discussion of FIG. 3B.

Customer keyed information 309 refers to information that is keyed/typed or otherwise input into application 393 by the customer.

In one embodiment, the location information determined by location information evaluator 304, and the customer specific information provided by the customer specific information engine 320 is prefilled into the application 393. By pre-populating application 393 prior to presenting it to the customer, the abandonment rate will be improved as the application 393 completion process is reduced. Moreover, the amount of required customer keyed information 309 will be reduced.

Referring now to FIG. 3B, a block diagram of a customer information acquisition system 350 is shown in accordance with an embodiment. In one embodiment, customer information acquisition system 350 includes mobile device 110, a customer specific information engine 320, and a credit account builder 330. Although a number of applications and components are shown in customer information acquisition system 350, it should be appreciated that the components and applications may be located separately from one another. For example, one or more of the components and applications may be found on one or more locations, such as, but not limited to, a computer in the retail store, a server at a remote location, on the cloud 326 or the like.

In one embodiment, mobile device 110 provides a device ID 316 and/or the customer ID 318. In general, device ID 316 is one or more device identification characteristics such as, but not limited to, a mobile telephone number, serial number, international mobile equipment identity (IMEI), integrated circuit card identifier (ICCID) (e.g., the SIM card number), mobile equipment identifier (MEID), secure element chipset identify (SEID), a media access control (MAC) address, Internet protocol (IP) address, universal unique identifier (UUID), model number, product number, serial number, or the like.

In one embodiment, the type of device ID 316 used for the process is based upon an evaluation of which device ID would provide the best defense against fraud. For example, a customer's mobile number could be easily obtained (e.g., via social media, public records, white pages, Internet search, etc.) so it would be a lower device ID option on a fraud scale. In contrast, the customer's mobile device serial number, IMEI, ICCID, MEID, SEID, or the like is much less likely to be openly shared (via social media, public records, guessed, etc.) so it may be that one of the IMEI, ICCID, MEID, SEID, or the like would be the device ID with the highest fraud prevention value.

Customer ID 318 can be the customer's identification information such as, name, zip code, social security number or a portion thereof, driver's license number or a portion thereof, or the like that is used to identify a specific customer.

In one embodiment, the customer ID 318 that is requested for the process is based upon an evaluation of which the possible customer ID's would provide the best defense against fraud. For example, a customer's birthday, address, email, and the like can often be easily obtained (e.g., via social media, public records, etc.) or easily guessed, so it would also be a lower customer ID option on a fraud scale. In contrast, a social security number (or last four, six, seven, five, middle three, five, first 6, 7; middle three +last two; or any other amount or combination of the nine social security numbers) is much less likely to be openly shared (e.g., via social media, public records, guessed, etc.) so it may be that a pre-selected portion of the SSN (or a changing selected portion of the SSN) would be the customer ID with the highest fraud prevention value.

In one embodiment, customer specific information engine 320 will receive a message (or other digital input) from a customer's mobile device 110 that will include one or both of the device ID 316 and customer ID 318.

In one embodiment, customer specific information engine 320 will use device ID 316 and/or customer ID 318 to obtain customer specific information 323 to prepopulate an electronic form such as application 393. In general, customer specific information 323 includes information such as: a name, a full or partial address, a driver's license number, a social security number, and the like.

For example, customer specific information engine 320 may access the different search locations via the cloud 326. An example of cloud 326 is a network such as the Internet, local area network (LAN), wide area network (WAN), or the like.

One embodiment uses the device ID 316 and/or customer ID 318 information to perform a proprietary search 5 of at least one proprietary database 16. In general, the proprietary database 16 may be one or more databases such as a credit accounts database, or the like, that store a company's private database such as an Alliance Data Legacy database or the like. Proprietary database 16 will include customer specific information 323 for customers that have existing accounts with the company, have previously applied for an account, or the like.

In one embodiment, the proprietary search 5 will only search a database related to a specific company. For example, if the credit account builder is a specific company, e.g., Nash's skate and bike emporium, then in a company specific database search, only the existing customer information related to Nash's skate and bike emporium will be searched. For example, a check is performed to see if the customer has an existing brand account, e.g., is already an existing customer in the database.

However, if the proprietary search 5 is for a group of companies, a shared information database, or the like, then all of the customer information in the databases may be searched for a match with the device ID 316 or the customer ID 318. For example, if the database includes Nash's skate and bike, Mike's hardware, and Tarrin's dress stores, and all three companies are sharing information, then the search would encompass all three store's databases of information.

For example, search an internal accountholder database 16 to see if the customer has another account within the shared information database. For example, if the customer does not have a Nash's skate and bike account, the underlying credit account, e.g., Alliance Data database, is searched to see if the customer has an account at a different brand associated with Alliance Data.

In one embodiment, customer information 6 that is found in the proprietary database 16 will be verified using a confidence factor 7. For example, if only one record is found and it is 5 days old, the confidence in the found records would likely be below a confidence threshold. In contrast, if 2 years of records are found, such as prior accounts, present accounts, memberships, rewards information, and the like, then the confidence in the customer specific information 323 found in the records would be above the confidence factor threshold. If the customer specific information 323 is above the confidence threshold, then the customer specific information 323 is deemed valid. At that point, the customer specific information 323 is returned via return information 12 to customer specific info engine 320 and then passed on to credit account builder 330.

One embodiment incorporates one or more of several fraud mitigation business rules to attempt to prevent fraudulent activity; e.g., to validate the found records. These business rules include logic that looks at specific activity on a customer's account that point to potentially fraudulent activities. In addition, a fraud mitigation tool may be implemented. The fraud mitigation tool will use device and internet protocol (IP) information to predict if the credit application can be trusted or will eventually become fraudulent.

For example, in one embodiment, the fraud mitigation tool will ignore any credit accounts that meet situations such as, but not limited to, the following: It is associated within a brand(s) that have been determined to have a high propensity for fraud. It is currently in a derogatory status. The account was opened within a defined number of days, where the number of days is controlled by internal parameters and can be tightened, loosened or turned off. The device number matched has been changed within a defined number of days, where the number of days is controlled by internal parameters and can be tightened, loosened or turned off. An authorized buyer has been added to the account within a defined number of days, where the number of days is controlled by internal parameters and can be tightened, loosened or turned off. The address has been changed within a defined number of days, where the number of days is controlled by internal parameters and can be tightened, loosened or turned off. The account has been inactive within a defined number of months, where the number of months is controlled by internal parameters and can be tightened, loosened or turned off. Multiple accounts are found for the mobile device number, zip code and last 4 digits of the SSN but all accounts are not the same person, and the like.

If no customer specific information 323 is found during the proprietary search 5 or if the found customer specific information 323 cannot be validated, then the device ID 316 and customer ID 318 are passed on to a secondary search 25. At secondary search 25, a second source search engine 28 will search at least one secondary source database 26. One example of secondary source database 26 is a reverse device number look up such as reverse device look-up. However, other secondary source databases may be searched such as, but not limited to: social media sites, search engines, online public and/or private records, reverse name and device number engines, and the like. In one embodiment, the customer specific information 323 may be obtained by performing a secondary source database 26 search with the customer ID 318 and the device ID 316.

In one embodiment, the secondary search 25 may be for example, a real-time call to a reverse device look-up product to try and locate the customer. In general, reverse device look-up products provide accurate and current customer telephone information. In many cases, the data is updated regularly from a broad range of sources, including regional bell operating companies, white pages and proprietary sources. One embodiment also integrates validation and authentication aspects that add further benefits to append address information for a customer. In general, validation and authentication aspects match customer name and zip code information that was returned from the reverse device look-up, against data from a secondary source to return full address data.

If customer information 36 is found, then the customer specific information 323 is returned via return information 12 to customer specific info engine 320. If no customer specific information 323 is found from the secondary search 25, then no customer specific information 323 will be pre-populated into the forms. That is, the customer specific info engine 320 will receive a return empty 39. However, if a match is made, then the customer specific information 323 can be used to pre-populate a portion of the application, e.g., name, address, city, state, zip, mobile device number, email, etc.

This is a benefit of the customer information acquisition with form population capability. Utilizing the form population reduces the amount of data a customer has to key by locating the customer's name and address via automated searches.

In one embodiment, when a customer has to enter or change their address and begins to type their address, a search is invoked that returns a list of potential results based on the zip code that was entered in the initial customer experience. As more characters are typed, the picklist is refined to display closer matches. When the address is selected, it will be checked for completeness and the associated city and state will be auto pre-filled.

Referring now to FIG. 3C, a block diagram of a credit account builder 330 for adding a digital pass 130 with purchase capability to mobile wallet 129 of a customer's mobile device 110 is shown in accordance with an embodiment. In one embodiment, credit account builder, credit account generator 360, and/or the related components are computing systems similar to computer system 700 described in detail in the FIG. 7 discussion herein.

In one embodiment, credit account builder 330 receives the customer specific information 323 (and any other information) from the application 393. In one embodiment, credit account builder 330 includes a credit determiner 340, a credit account generator 360, and a metadata file generator 365. Although a number of applications and components are shown, it should be appreciated that there may be more or fewer components and applications used by (or in conjunction with) credit account builder 330. Moreover, different pieces may be combined, re-organized, located separately from one another, or the like.

In general, credit determiner 340 accesses a database 341, such as a credit reporting agency, via cloud 326 to determine credit information for the customer based on the customer specific information 323. An example of cloud 326 is a network such as described herein. The credit reporting agency could be a company such as, but not limited to, Experian, Equifax, TransUnion, Innovis, and the like.

Credit determiner 340 will analyze the customer's credit information obtained from the credit reporting agency database 341 to determine if the customer passes a credit criteria. If the customer does not pass the credit criteria threshold, the customer does not qualify for a credit account, and no further credit account generation action is taken. If the customer does pass the credit criteria threshold, new credit account generator 360 will receive the information in the new credit account application from credit determiner 340.

In one embodiment, credit determiner 340 will analyze the information provided by credit reporting agency 141 to determine a credit account limit. For example, the credit account limit may be 1000.00 USD.

In one embodiment, new credit account generator 360 includes a customer account identifier 361, a customer data file builder 362, a token generator 363, and a metadata file generator 365.

Customer account identifier 361 accesses database 327 which stores a plurality of customer credit accounts and utilizes the customer specific information 323 in order to identify any other accounts related to the customer. In one embodiment, customer account identifier 361 accesses database 327 via cloud 326. Database 327 may include store specific data, brand specific data, retailer specific data, a shared database, a conglomerate database, a portion of a larger storage database, and the like. Moreover, database 327 could be a local database, a virtual database, a cloud database, a plurality of databases, or a combination thereof.

In one embodiment, database 327 stores a plurality of customer credit accounts, a plurality of customer reward accounts and/or offers, coupons, and the like. Customer account identifier 361 searches database 327 for one or more customer accounts (e.g., credit accounts, reward accounts, and/or offers, coupons, and the like) that are held by the identified customer. If any other customer accounts are found, they are provided by the customer account identifier 361 to customer data file builder 362 which links the one or more customer accounts with the new credit account information to build a customer data file.

Token generator 363 then generates a token identifying the customer data file. In one embodiment the token is an identification number, hash, or other type of anti-tamper encrypted protection that is generated as an identifier for the customer data file.

Metadata file generator 365 generates a metadata file 370 formatted for mobile wallet 129, the metadata file 370 including the digital pass 130 and the token. In one embodiment, the digital pass 130 could include an image and the token is embedded within the image data. In another embodiment, the token could be separate from the image that is presented when digital pass 130 is accessed and would be provided at the time of the transaction. For example, the token could be provided via a near field communication (NFC) between the mobile device 110 and the POS when digital pass 130 is presented at the POS. In another embodiment, the entire digital pass 130 metadata file 370 could be provided via NFC at the time of the transaction and no imagery would be obtained by the POS even if it was presented on the display 112. In one embodiment, metadata file 370 could simply present a scanable code, or a set of numbers on the mobile display. In one embodiment, metadata file 370 includes an instruction that causes the digital pass 130 to be placed in a first location of mobile wallet 129 on the customer's mobile device 110.

The metadata file 370 is then provided from the credit account builder 330 (e.g., a credit provider computer system, third-party computing system, or the like) to the customer's mobile device 110. The metadata file 370 is added to mobile wallet 129 on the customer's mobile device 110, wherein an access of the metadata file 370 in the mobile wallet causes the digital pass 130 to be presented by the customer's mobile device 110. In general, the presentation of digital pass 130 by the customer's mobile device 110 could be audible, visual, or the like, to provide payment at the time of a customer purchase as described herein. In one embodiment, metadata file 370 could present a scanable code, or a set of numbers on the display of the mobile device, such that the display could be scanned, or the information keyed into a computing system during the payment process. In one embodiment, the information could be keyed in by the customer, by an associate at the retail store, or some combination thereof. In one embodiment, digital pass 130 is instantly available to be used as a form of payment.

Figure 4:
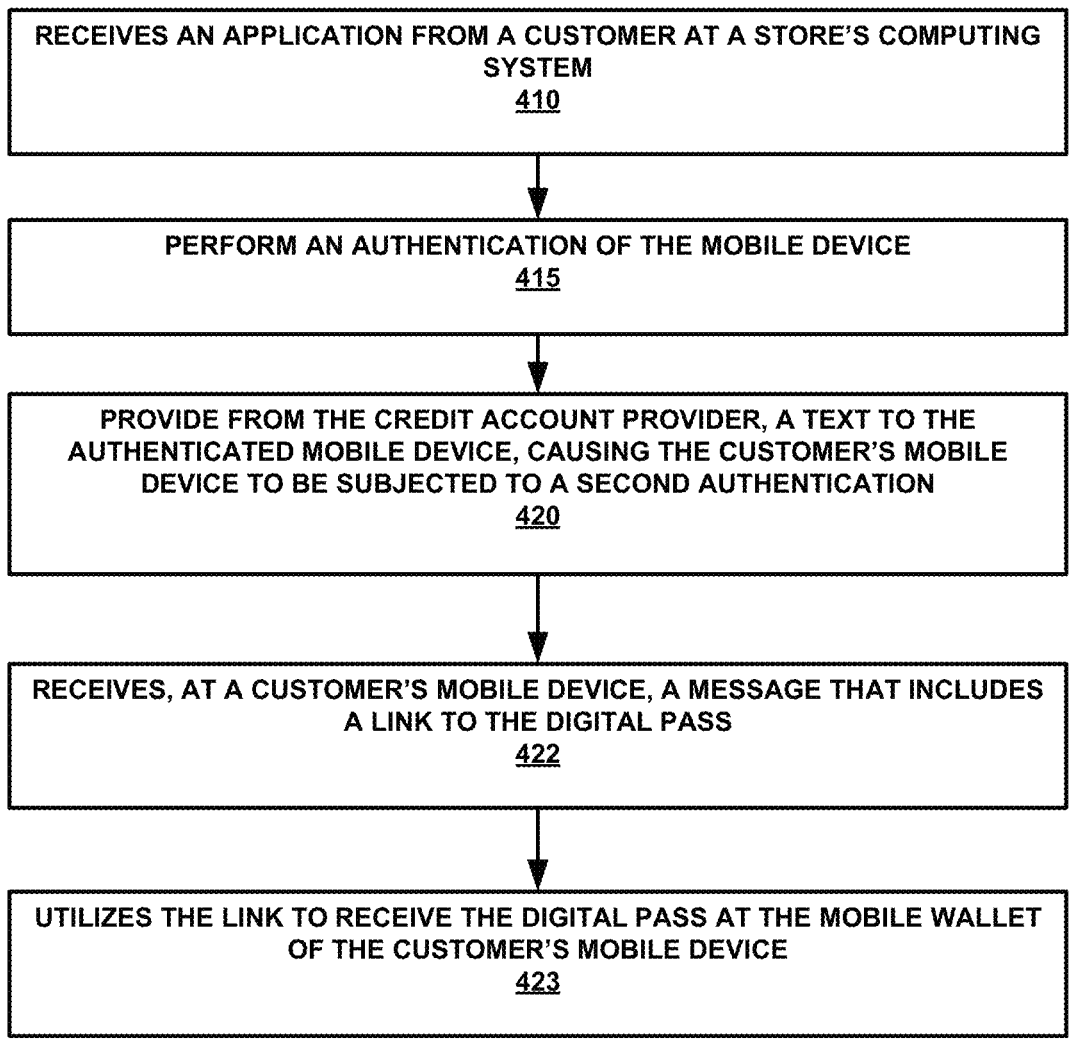
FIG. 4 is a flowchart of a method for performing a mobile device verification for an electronic application before providing a digital pass to an approved customer, in accordance with an embodiment.

With reference now to FIG. 4, a flowchart 400 of a method for performing a mobile device verification for an electronic application before providing a digital pass to an approved customer, in accordance with an embodiment.

With reference now to 410 of FIG. 4, one embodiment receives an application from a customer at a store's computing system. In one embodiment, the electronic application is a credit application for a new credit account. In another embodiment, the electronic application is a reward account application for a new reward account (or offer, coupon, etc.). In one embodiment, the information in the application is provided by the customer, provided by an interaction with the customer's mobile device, and/or provided by the customer specific information engine.

Referring now to 415 of FIG. 4, in one embodiment, the store's computing system (e.g., device 185) will provide the customer's mobile device ID to a verification system such as system 306 to authenticate the customer's mobile device. In one embodiment, this verification is done before the application is approved.

Referring now to 420 of FIG. 4, the credit account provider will send a text to the authenticated mobile device, the text having a link therein. The link causing the customer's mobile device information to be subjected to a second authentication. The second authentication being performed after the customer is approved for the credit account but before a digital pass is provided to the customer's mobile device. For example, the credit account provider will send the message (text, SMS, MMS, email, or the like) to the phone number provided by the customer. When the text is opened on the customer's mobile device it will trigger the verification process on the customer's mobile device.

Since the credit account provider initiates the communication (e.g., sends the access to the customer's mobile device), the customer responding to the communication, becomes a part of the verification and fraud mitigation process.

In other words, since the store associate or customer enters the customer contact information into device 185 that will be used by the credit account provider to send a message to the customer's mobile device, and since the customer opens the message and selects the link, which initiates the second verification process; the customer contact information will be validated before the customer receives the access to the digital pass. In so doing, the second verification of the customer contact information is required before the new account can be accessed (or received, downloaded, installed, etc.) by the customer's mobile device.

With reference now to 422 of FIG. 4, one embodiment receives, at a customer's mobile device, a message that includes a link to receive the digital pass at the customer's mobile wallet. The link could be a web URL link or the like. In general, the message could be a text message, an email message, or the like.

At 423 of FIG. 4, one embodiment utilizes the link to receive the digital pass, the link causing the digital pass to be provided to the mobile wallet of the customer's mobile device 110.

In one embodiment, instead of via the selection of the link, the digital pass is received via a device-to device communication between the customer's mobile device and device 185. In one embodiment, the device-to-device communication between the customer's mobile device and device 185 can include, for example, a data exchange, a hotspot interaction, a WiFi communication, a near field communication (NFC), and the like. For example, using a device bump, device 185 is configured to send a signal to the customer's mobile device that will provide the access to the digital pass for the customer's mobile device. Thus, in one embodiment, device 185 will push the digital pass over NFC (Bluetooth, WiFi triggering link, or the like) to the customer's mobile device when a customer taps device 185 with the customer's mobile device 110.

Fraud Detection

Figure 5:
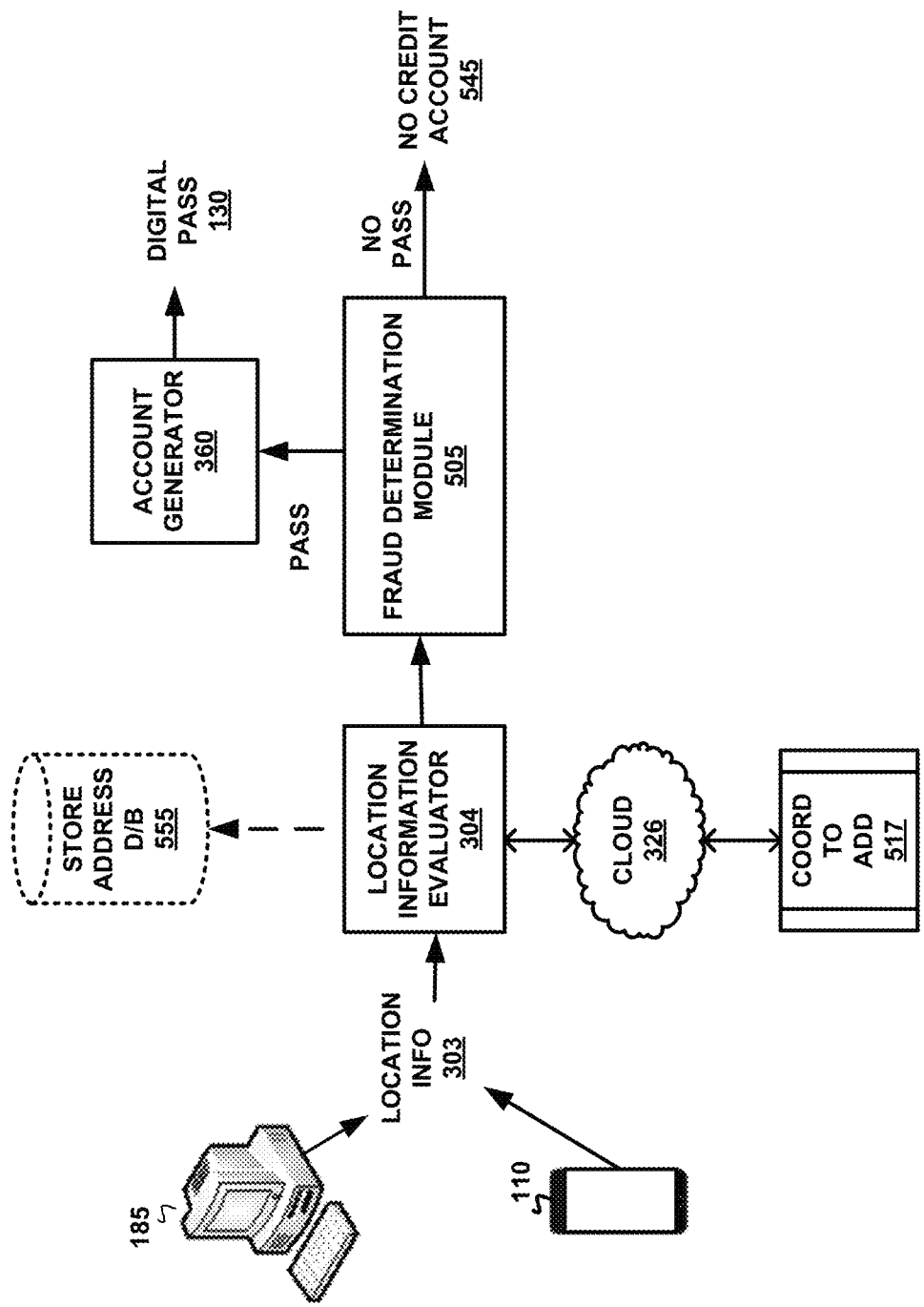
FIG. 5 is a block diagram of an example fraud detection system, in accordance with an embodiment.

With reference now to FIG. 5, a block diagram of a system for fraud detection is described in accordance with an embodiment. In general, system 500 includes a fraud determination module 505 which receives address information from the location information evaluator 304 which determines the address from the raw location information 303 provided by mobile device 110 and location information provided by device 185. System 500 also includes cloud 326 which may be any type or wired or wireless network connection including private, public, Local, Wide, Internet, and the like.

In one embodiment, fraud determination module 505 is a rules based fraud determination engine, that can change the weighting of risk factors, etc. For example, the customer ID and/or the device ID information that is obtained can be used to evaluate for fraud. For example, the customer ID that is provided to the application process is ranked or evaluated for its fraud potential. For example, 1 is the lowest fraud risk and 10 is the highest. If the customer's zip code is provided it may be ranked at a 7 out of 10 for fraud. In contrast, if the last 6 of the customer's SSN is provided it may be ranked at a 2 out of 10 for fraud.

Similarly, the device ID that is provided to the application process is ranked or evaluated for its fraud potential. For example, 1 is the lowest fraud risk and 10 is the highest. If the mobile number is provided it may be ranked at a 5 out of 10 for fraud.

The fraud risk is then evaluated. The evaluation could be for one of the identifiers, both of the identifiers, or a combination of the identifiers. For example, in one embodiment when the fraud scale is base 10, the single identifier fraud risk would be evaluated as low if it is a 3 or below, medium if it is between 4-5, high if it is between 6-8, and unacceptable if it is 9 or above.

If both of the fraud rankings are added together the scale could remain the same or could be different. For example, the scale could remain the same, be doubled, have the range changed such that 15 (or whatever value is selected) is the new top range, etc. For example, the fraud risk for the combined value (using a top range of 15) would be evaluated as low if it is a 4 or below, medium if it is between 5-8, high if it is between 9-11, and unacceptable if it is 12 or above.

In another embodiment, the scale could be out of any number, e.g., 20, 50, 100, etc. depending upon the desired granularity. In one embodiment, there could be an additional level of granularity if the resultant fraud risk was at a certain level (e.g., a 6 could cause additional evaluation to determine a finer granularity of 6.3 or 6.6).

In one embodiment the result of the fraud risk determination controls at least one aspect of the new credit account. For example, if the fraud risk determination result is low, the fraud determination does not interfere with the amount of credit available on the new credit account.

In contrast, when the result of the fraud risk determination is medium, the amount of credit available on the new credit account may be reduced (for example the customer would qualify for a credit limit A, the credit limit would be reduced by fraud risk amount (or percentage, or the like) B, resulting in an initial credit limit of A-B (or A reduced by B %, or the like). Similarly, when the result of the fraud risk determination is high, the amount of credit available on the new credit account is again reduced based on the fraud risk. In one embodiment, the reduction of the credit limit is only for a probationary time period, such as until the fraud risk is deemed to be lower.

In one embodiment, if the fraud risk determination is unacceptable, the application process will deny the customer from receiving the new credit account. In one embodiment, if the fraud risk determination is unacceptable the application process will deny the customer from continuing the application process for the new credit account. In one embodiment, if the fraud risk determination is unacceptable, the application process will not provide any automatic pre-filling of the application and flag the application for the new credit account.

Consider the following example for purpose of clarity. In the following examples, the scale for a single risk factor is 10 and the combination of risk factors is 15.

A. The customer's zip code is provided and is ranked at a 9, e.g., an unacceptable fraud risk.

B. The last 4 of the customer's SSN is provided and is ranked at a 2, e.g., a low fraud risk.

C. The mobile number is provided and is ranked at a 5, e.g., a medium fraud risk.

D. The mobile device UUID is provided and is ranked at a 2, e.g., a low fraud risk.

Example 1. If customer ID 'A' (risk level 9) and device ID 'C' (risk level 5) were provided, the fraud determination would be an unacceptable customer ID fraud risk, and a medium device ID fraud risk. If the fraud determination was based on the highest single fraud determination, then the fraud determination would result in an unacceptable fraud risk. In one embodiment, this would stop the application process and the customer would be denied.

Example 2.1. If customer ID 'A' (risk level 9) and device ID 'C' (risk level 5) were provided, the fraud determination would be an unacceptable customer ID fraud risk, and a medium device ID fraud risk. In one embodiment, the application could request a second customer ID 'B' (risk level 2). After the customer provided information customer ID 'B', in one embodiment, the customer ID fraud risk would become a risk level 2. If the fraud determination was based on the highest single fraud determination, then the fraud determination would result in medium fraud risk (risk level 5). In one embodiment, this would allow the application process to be completed but the customer would receive a credit account that may or may not have a reduced credit limit (e.g., 1,000 dollar limit, etc.).

Example 2.2. In one embodiment, the customer ID and/or device ID is used during a look-up process for identifying the customer and obtaining customer information. The customer information would be the information necessary for completing the application and/or the prequalification process. In one embodiment, customer ID 'A' would be compared with the additional customer information. If customer ID 'A' (risk level 9) correlates with the customer information, this could cause a further risk level reduction from the risk level 5 in example 2.1 to the low fraud risk level 4. In so doing, the customer would not receive a reduced initial credit limit.

Example 3. If customer ID 'A' (risk level 9) and device ID 'C' (risk level 5) were provided, the fraud determination would be an unacceptable customer ID fraud risk, and a medium device ID fraud risk. If the fraud determination was based an amalgamation of two or more of the fraud components, then (in one non-weighted embodiment) the fraud determination would result in a risk level 14 which would result in an unacceptable fraud risk. In one embodiment, this would stop the application process and the customer would be denied.

Example 4.1. If customer ID 'A' (risk level 9) and device ID 'C' (risk level 5) were provided, the fraud determination would be an unacceptable customer ID fraud risk, and a medium device ID fraud risk. In one embodiment, the application could request a second device ID 'D' (risk level 2). After the customer provided information D, in one embodiment, the device ID fraud risk would become a risk level 2. If the fraud determination was based on an amalgamation of two or more of the fraud components, then (in one non-weighted embodiment) the fraud determination would result in a risk level 11 which would be a high fraud risk. In one embodiment, this would allow the application process to be completed but the customer would receive a credit account with a reduced credit limit (e.g., 500 dollar limit, etc.).

Example 4.2. In one embodiment, the customer ID and/or device ID is used during a look-up process for identifying the customer and obtaining customer information. The customer information would be the information necessary for completing the application and/or the prequalification process. In one embodiment, device ID 'C' would be compared with the additional customer information. If device ID 'C' (risk level 5) correlates with the obtained customer information, this could cause a further risk level reduction from the high fraud risk level 11 in example 4.1 to the medium fraud risk level 8. In one embodiment, this would allow the application process to be completed but the customer would receive a credit account that may or may not have a reduced credit limit (e.g., 1,000 dollar limit, etc.).

Example X. If customer ID 'A' (risk level 9) and device ID 'C' (risk level 5) were provided, the fraud determination would be an unacceptable customer ID fraud risk, and a medium device ID fraud risk. In one embodiment, the application could request a second customer ID 'B' (risk level 2). After the customer provided information customer ID 'B', in one embodiment, the customer ID fraud risk would become a risk level 2. In one embodiment, the application could request a second device ID 'D' (risk level 2). After the customer provided information D, in one embodiment, the device ID fraud risk would become a risk level 2.

If the fraud determination was based on the highest single fraud determination, then the fraud determination would result in low fraud risk (risk level 2).

If the fraud determination was based on an amalgamation of two or more of the fraud components, then (in one non-weighted embodiment) the fraud determination would result in a risk level 4 which would also be a low fraud risk.

Further, the customer ID and/or device ID is used during a look-up process for identifying the customer and obtaining customer information. In one embodiment, customer ID 'A' and device ID 'C' would be compared with the obtained customer information. If customer ID 'A' and device ID 'C' correlate with the obtained customer information, this would provide a further fraud risk level reduction. In contrast, if one or both of customer ID 'A' and device ID 'C' did not correlate with the obtained customer information, this could result in an increase in the fraud risk level. In one embodiment, the increase could be to a next higher level. In one embodiment, the customer may be asked about the lack of correlation.

In one embodiment, if one or both of customer ID 'A' and device ID 'C' did not correlate with the obtained customer information, the non-correlated information could be manually or automatically evaluated to determine if the lack of correlation is due to a clerical, typographical, or accidental error. For example, if customer ID 'A' did not correlate, it would be evaluated. If the customer input customer ID 'A' was zip code 12555 and the obtained customer information is zip code 12255, it may be evaluated as a customer input error and no fraud risk escalation would be made. In contrast, if the customer input customer ID 'A' was zip code 96896 and the obtained customer information is zip code 12255, it would be evaluated as a deceitful input and the fraud risk escalation would be made or additional fraud risk evaluations would occur.

Thus, the fraud determination could be set as the highest fraud ranking of the highest fraud component, it could be set as an amalgamation of two or more of the fraud components, it could be adjusted based on the following additional fraud determination factors, it could be set as a weighted value for one of the customer ID versus the Device ID, e.g., the customer ID ranking carries 20% weight and the device ID carries an 80% weight, etc. Of course, the weighting could be ID dependent, set to different values, or the like.

In addition to the device ID and customer ID fraud determination discussed above, there could be additional fraud determination factors that are described below and can be used to modify the fraud risk determination.

Additional Fraud Determination Factors

After the customer is identified and the customer information is obtained, the customer information will be evaluated to determine if the customer's information in the account center has had recent changes to home address, email, device number, etc. If a recent change has occurred, then additional fraud evaluation will occur.

Another fraud feature is that if the location of device 185 and/or the applying customer device 110 and/or the store 155 are in the same location, then there is additional fraud mitigation. In other words, by comparing one or more combinations of the two or all three of the locations, a fraud risk determination can be made.

In one embodiment, the location of device 185 is known from the store address database 555, from location information obtained from a mapping app, GPS, or the like on device 185, or the like. The location information evaluator 304 would evaluate the real-time location information 303 of the customer's mobile device 110 and cross-reference the real-time location information 303 with the one or more different coordinate-to-address determination sources 517, to generate a likely real-time address of the customer.

In one embodiment, a fraud risk determination is made by comparing the store's customer credit application computer location information with the store location (e.g., a lat-long reference, etc.). If the store's customer credit application computer is within the pre-defined nominal distance (e.g., 0-30 feet) of the store's location, etc., then the fraud mitigation is met. In contrast, if device 185 is not in the same location or within the pre-defined nominal distance (e.g., 0-30 feet) of the store's location, then the fraud mitigation would not be met and a fraud deterrent would be implemented (e.g., the store's customer credit application computer has been stolen, is being used improperly, deny any electronic application provided from the store's customer credit application computer, etc.).

In one embodiment, the fraud risk determination is made by determining the distance between the store's location and the location of the customer's mobile device. If they are in the same location, or within a pre-defined nominal distance (e.g., 0-20 feet) from one another, then the fraud mitigation could be met.

However, if the customer's mobile device 110 is not in the same location or within the pre-defined nominal distance (e.g., 0-20 feet) as the store, then the fraud mitigation would not be met, and a fraud deterrent could be implemented.

In one embodiment, if the location of the customer's mobile device is within close range of the store (e.g., between 20-50 feet of the store), then the fraud risk will be considered low. In one embodiment, if the location of the customer's mobile device location is a further distance from the store (e.g., 100-500 feet), then the fraud risk will be considered medium. In one embodiment, if the location of the customer's mobile device is far away from the store (e.g., a mile or more distant) then the fraud risk will be considered extremely high. Although a number of values are provided, it should be appreciated that the distances and corresponding fraud levels could be adjusted by the credit provider.

In one embodiment, the fraud risk determination can be as an input to make determination that would control at least one aspect of the new credit account. For example, in one embodiment, when the fraud risk determination results in the lower fraud risk, fraud determination module 505 does not interfere with the amount of credit available on the new credit account. In contrast, when the fraud risk determination results in the higher fraud risk, fraud determination module 505 will provide input to account generator 360 to reduce the amount of credit available on the new credit account. In one embodiment, the reduction is only for a probationary time period until the fraud risk is deemed to be lower.

By automatically determining the location of the customer's mobile device, instead of allowing the customer to input the location information as part of the application process, the opportunity for fraudulent application detection in the Internet centric mobile application world is reduced since the store/customer location information is automatically derived by the mobile device GPS, a mapping application, a mobile tower provided location, etc.

This location determination fraud risk evaluation will provide significant cost savings by using methods and systems for fraud analysis that were not necessary, and did not exist, prior to the capability for device 185 to obtain customer mobile device location information when the customer applied for a new account. Moreover, the solution is Internet centric and utilizes location capabilities to solve a problem that necessarily exists in a network centric environment and specifically in the network centric environment of electronic applications.

In one embodiment, if the fraud level is high, fraud determination module 505 will deny the credit application and no credit account 545 will be established. In contrast, if the fraud level is low, fraud determination module 505 will pass the credit application to account generator 360 with a low or zero fraud determination resulting in a suggestion that no change in the initial credit amount is needed. Similarly, in one embodiment, if the fraud level is somewhere in between, fraud determination module 505 will pass the credit application to account generator 360 with a fraud determination resulting in a suggestion that the initial credit amount be adjusted down accordingly.

In one embodiment, lowering an customer's credit limit accordingly would mean a reduction of 10-20% from what would have been the initial credit amount for a low-to-medium risk determination, while a medium risk determination would mean a reduction of 50-75% in the initial credit amount. However, it should be appreciated that these percentages are one example. The risk aversion of the credit account provider may cause an increase or decrease in the percentages and even turn the medium risk applications into rejections such that no credit account 545 is established.

Temporary Credit Account

With reference now to FIG. 6, a block diagram of a temporary credit account 600 as presented on a display screen 112 of a mobile device 110 is shown in accordance with an embodiment. In one embodiment, temporary credit account 600 is a temporary version of the newly established credit account 130. For example, temporary credit account 600 will operate the same way as credit account 130. However, in one embodiment, temporary credit account 600 will have restrictions that will not be included with credit account 130 which will replace temporary credit account 600 for security and fraud purposes after a given amount of time.

Although a number of different features are shown in conjunction with the description of temporary credit account 600, it should be appreciated that some embodiments may include additional features or may skip some of the features altogether. The features of temporary credit account 600 described herein are not intended to limit the subject matter to these embodiments. On the contrary, the subject matter described herein is intended to cover alternatives, modifications and equivalents, which may be included within the spirit and scope as defined by the appended claims.

In one embodiment, the temporary credit account 600 is received at mobile device 110 from account generator 360 (of FIG. 3C) via a delivery method such as, but not limited to: a text, a mobile push, an interactive kiosk, beacon, etc. and via networks such as near field communication (NFC), Bluetooth, WiFi, or the like.

For example, the account generator 360 will send a text message to mobile device 110 which will include the temporary credit account 600 information such that the opening of the text message will result in the display of temporary credit account 600. As described below, a time limit 605 is included with temporary credit account 600. In one embodiment, the time period will begin to toll from the time that the text message is received at mobile device 110. In another embodiment, the time period will begin to toll when the text message is opened at mobile device 110.

In a mobile push scenario, the account generator 360 will push the temporary credit account 600 information to mobile device 110. In one embodiment, the result of the push will be the display of temporary credit account 600 on the display of mobile device 110. In one embodiment, the time period will begin to toll from the time that the pushed message is received at mobile device 110.

In another embodiment, the result of the push will be the display of an indicator that temporary credit account 600 has been received and the customer will have to interact with the indicator on mobile device 110 before the temporary credit account 600 is display in full on mobile device 110. In one embodiment, the time period will begin to toll when temporary credit account 600 is display in full on mobile device 110.

In another embodiment, the result of the push, text message, beacon data reception, etc. will be the receipt of a link to temporary credit account 600. After the link is received, the customer will have to follow the link on mobile device 110 to obtain the temporary credit account 600 information. The information would then be display in full on mobile device 110 (e.g., via a download option available at the location provided by the link, via the temporary credit account 600 information downloaded automatically to the mobile device 110 after some type of verification, or the like. In one embodiment, the time period will begin to toll when temporary credit account 600 is display on mobile device 110.

After receiving temporary credit account 600 information from the account generator 360, temporary credit account 600 will be displayed on the display of mobile device 110. In one embodiment, the time period will begin to toll from the time that the temporary credit account 600 is received at mobile device 110 from the interactive kiosk.

Temporary credit account 600 has a time limit 605 associated therewith. In general, the time limit 605 is an amount of time that credit account 600 will be valid. While the time limit 605 is active, temporary credit account will be displayable on display screen 112 of mobile device 110. After time limit 605 ends, temporary credit account 600 will no longer be displayed on display screen 112 of mobile device 110. Moreover, at the end of time limit 605, temporary credit account 600 will no longer be a valid way of making a purchase. In one embodiment, the time limit 605 may be a fixed amount of time that is non-extensible. For example, time limit 605 may provide a fixed limit of 1 hour, 2 hours, 1.5 hours, or the like.

In another embodiment, time limit 605 may be a fixed amount of time but may include a limited number of extensions (e.g., 2, 3, or the like). For example, time limit 605 may provide a fixed limit of 30 minutes, 1 hour, 1.5 hours, or the like and may also provide a statement that "the valid time period can be extended x times". In one embodiment, during the last few minutes of the valid time period, there may be an option to extend time limit 605. Thus, if the customer has not finished shopping, the selection of the extension will allow the temporary credit account 600 to remain on screen and valid for use for another valid time period.

In general, time limit 605 is adjustable and can be set for a shorter or longer time period by the brand, or the credit provider. For example, a brand may decide to provide the temporary credit account 600 on the mobile device for a 2 hour time limit with no extensions, for a half hour time period with four extensions, etc. In another example, time limit 605 on the validity of the temporary credit account 600 are credit provider driven and are based on fraud prevention, theft, or the like. For example, the credit provided would designate the temporary credit account 600 to be valid for only 1 hour after issue such that if the customer lost mobile device 110, the opportunity for fraudulent purchases would be limited to only the 1 hour time limit 605. In other words, time limit 605 is provided to limit fraud or the like due to the loss of the phone or other surreptitious access to the customer's mobile device.

In one embodiment, when temporary credit account 600 is received by mobile device 110 it is automatically displayed on the display screen 112 and the amount of time that the pass is valid begins to be tolled. In another embodiment, the time limit 605 begins to run when temporary credit account 600 is displayed on display screen 112 of mobile device 110. In yet another embodiment, the time limit 605 begins to run when temporary credit account 600 is opened and displayed on display screen 112 of mobile device 110.

Information 610 refers to purchase information about the use of temporary credit account 600. The information 610 can include limitations on what can be purchased, e.g., no gift cards, and the like.

Credit limit 621 is the total amount of credit available to the account holder. It is the limit of the actual card and is not indicative of the amount of credit available on the temporary account. Temporary account limit 622 is the amount of money available for the customer to spend with the temporary credit account 600. In one embodiment, the temporary account limit 622 can be equal to, or less than, the actual account credit limit and is defined by the credit provider and the brand. For example, the temporary account limit 622 could be adjusted based on potential for fraud.

In another embodiment, temporary account limit 622 is based on the type of product sold by the brand, the average ticket size for the brand, and the like. For example, a jewelry store may have a higher temporary account limit 622 than a hardware store.

Temporary account number 623 is a number that is assigned to the temporary account that is linked to the underlying account, but it is not the underlying account number. In one embodiment, the temporary account number 623 is the underlying account number.

Temporary expiration date 624 is generally not related to the underlying account but is instead just for the temporary credit account purchase process. The temporary expiration date 624 can be for the day after the credit account is provided, or it may be for a month or so later. For example, the temporary expiration date 624 may not be the date is valid as it may make purchases difficult since the expiration date is the date of purchase. As such, the temporary expiration date 624 can be a month or more past the date of the temporary credit account 600 to ensure that the purchase is not rejected due to the temporary expiration date 624. In one embodiment, the temporary expiration date 624 is related to the underlying account.

Similar, to temporary expiration date 624, the temporary security code 625 is also not related to the underlying account specifically, but is instead provided as it may be necessary when utilizing the temporary credit account 600. In one embodiment, the temporary security code is related to the underlying account.

In one embodiment, temporary credit account 600 includes a scanable code 630, such as a barcode, QR code, or the like. In one embodiment, instead of having to input the temporary information 621-625 manually, code 630 is scanned by the retailer/clerk at the register or during the time of checkout to provide the temporary account details to the POS.

In one embodiment, temporary credit account 600 includes an animated digital watermark 660 that is displayed on display 112. The term "animated digital watermark", as used herein, is any visually perceptible image that is dynamically moving or animated that facilitates in ensuring that mobile payment card is authentic (or not fraudulent).

Animated digital watermark 660, by being animated, provides visual evidence that temporary credit account 600 is not a fraudulent copy. More specifically, animated digital watermark 660 provides visual evidence that the displayed temporary credit account 600 is not a fraudulent captured static image of the authentic temporary credit account 600.

For example, a merchant visually examining temporary credit account 600 displayed on device 110 will notice the dynamic moving properties of animated digital watermark 660 and determine that temporary credit account 600 is authentic and not fraudulent.

Animated digital watermark 660 can be any image with dynamic (or visually moving/changing) properties. For example, animated digital watermark 660 is a rotating logo of the bank that issued temporary credit account 600. In another example, animated digital watermark 660 is an image that constantly or variably changes shape, color, and/or position.

In various embodiments, animated digital watermark 660 varies based on the day, time, session, etc. In one embodiment, animated digital watermark 660 is a customer-interactive animated digital watermark. For example, a message is displayed in response to a customer selecting animated digital watermark 660 on the touch screen display. The displayed message, in response to the touch by the customer, provides visual evidence that the displayed temporary credit account 600 is not a fraudulently captured video of the authentic mobile payment card because a captured video of temporary credit account 600 (including animated digital watermark) would not be able to display a message in response to a customer touching the animated digital watermark in the fraudulent video.

In one embodiment, temporary credit account 600 also displays a show government issued ID 635 to promote the customer to show identification to the retailer. The information 640 after the show ID provides the APR and account details as well as a link to further information. Information 640 is modifiable and is based on legal requirements, credit provider requirements, customer information requirements, and the like.

Information 645 provides a summary of the temporary aspects to include the total amount of time the temporary account will be valid; the total number of allowed transactions, and the temporary credit limit. In one embodiment, information 645 is modifiable by brand, credit provider, or the like. In general, the total number of allowed transactions is a hard limit on the amount of times the temporary credit account 600 can be used to make purchases. The number may be limited by brand or by credit provider. For example, the temporary credit account would have a limited number of 3 uses. Thus, after the customer makes three separate purchases within the valid time frame, the temporary credit account 600 would no longer be valid, even if time and credit remained. Similarly, if the customer has used all available temporary credit on the second purchase, then there would be no third purchase capability as the temporary credit account 600 would be invalid due to the temporary credit amount being previously reached.

In one embodiment, information 645 is updated in real time to include the remaining time for account validity, the remaining credit amount, the remaining number of transactions, and the like. Optional information 650 includes use and guidance information for the customer.

In one embodiment, when the temporary account information is provided to the retailer, e.g., a purchase is pending with temporary credit account 600, a number of security checks can be performed based on the temporary account information. For example, the security check can confirm the pending purchase attempted by temporary account number 623 is coming from the brand to which it is related.

In one embodiment, the security checks also include a timing check to ensure that the provided account number is within its valid window and has not expired. The security checks additionally include a number-of-transactions check to ensure the pending transaction is within the amount of allowed transactions, e.g., 3 of 4 versus 5 of 4. The security checks can include a temporary account limit check to ensure the amount of the pending purchase is within the temporary account limit 622, that it remains within the amount remaining of the temporary account limit 622 if other purchases have already been made, etc. E.g., if temporary account limit 622 is $240.00 and a first purchase of 80.00 dollars has been made, the pending purchase amount would have to be less than or equal to the remaining temporary account limit 622 amount, e.g., $160.00.

Although a number of different things are shown and described as being presented as part of temporary credit account 600, it should be appreciated that the actual presentation could include more, fewer, and/or different things as part of the temporary credit account 600 as displayed. The features could be brand specific, store specific, credit account provider specific, customer preference, or the like, or a combination thereof. The presentation of temporary credit account 600 in FIG. 6 is one embodiment provided for clarity.

Purchase with Digital Pass

In an ecommerce environment, in one embodiment, when the customer reaches the checkout page, the customer could hand key the temporary account information temporary credit account 600 into non-brand ecommerce site and submits payment. In one embodiment, the transaction is passed to the credit account provider through Visa, Master Card or the like, with the correct ecommerce POS entry mode (set up by the brand/POS vendor). In one embodiment, the authorization is allowed due to a rule that prevents anything other than ecommerce to authorize. In one embodiment, the transaction is authorized by the credit account provider without VAN parameter restrictions but instead by the credit account provider's controlled divisional parameter.

At a POS, in one embodiment, the customer would present temporary credit account 600 to the POS (or another checkout system such as an associate's mobile device, etc.) When temporary credit account 600 is presented at checkout it could include the transmission of the token via a near field communication (NFC), a scan of image 630, a hand key entry of the temporary information e.g., 623-625, etc. In one embodiment, the token would be provided in conjunction with the information temporary credit account 600. The token, metadata, barcode, and/or the like would be provided from the POS to the credit account provider which would validate the token and link the purchase to the appropriate customer credit account. The credit account provider would then provide the authorization for the purchase to the POS and the transaction would be completed.

In one embodiment, the transaction could also include information from the mobile device 110, information such as but not limited to, customer biometric information, location information, the transaction time, the transaction date, etc. In one embodiment, the location information provided by the mobile device will include time and date stamp information. In another embodiment, the location, time and/or date could be obtained from the POS, a combination of the customer's mobile device and the POS, etc.

In one embodiment, for the transaction to occur, temporary credit account 600 would be validated using the internet connection from the POS, the biometric information for the customer (as provided via a token or the like) from the customer's mobile device, the location obtained from the mobile device, the time, the date of the transaction initiation, the mobile device identification number, etc.

In so doing, the security of the customer's temporary credit account 600 payment would be seamless and nearly instantaneous to the customer and the associate ringing up the transaction, but would include a plurality of checks and balances performed by the credit account provider, the brand, or a fraud determining evaluator assigned to make fraud mitigation determinations and/or evaluations.

In one embodiment, if the POS transaction includes the keying of the temporary account information from temporary credit account 600 at non-brand pin pad/POS, the transaction is passed to the credit account provider through Visa or Master Card with the correct store POS entry mode (set up by the brand/POS vendor). In one embodiment, the authorization is stopped due to a rule that prevents anything other than ecommerce to authorize. Similarly, if the temporary account information is swiped or dipped at a non-brand POS, the authorization is stopped due to a rule that restricts authorization on VAN information being swiped or dipped.

It is noted that any of the procedures, stated above, may be implemented in hardware, or a combination of hardware with firmware and/or software. For example, any of the procedures are implemented by a processor(s) of a cloud environment and/or a computing environment.

Example Computer System

Figure 7:
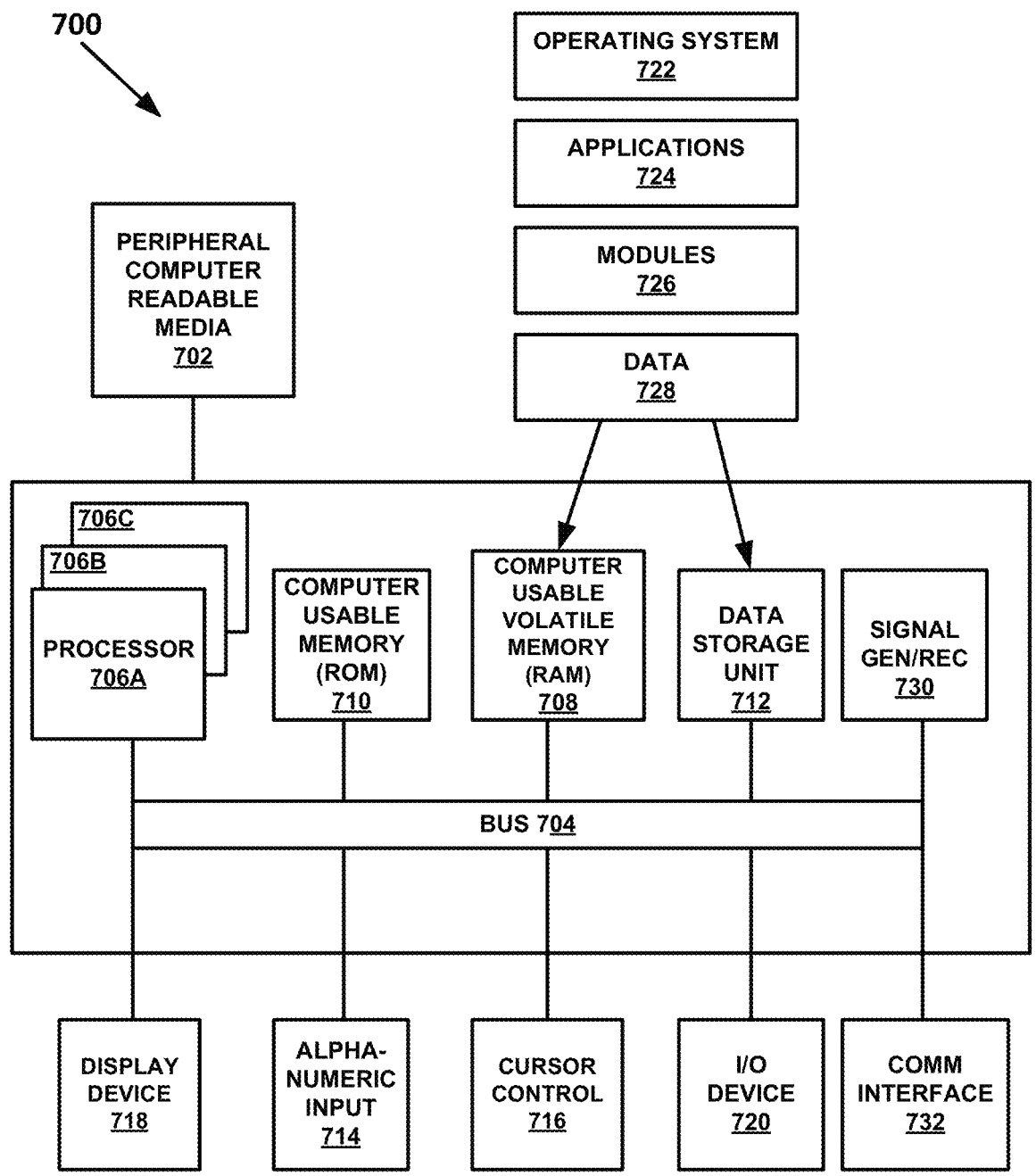
FIG. 7 is a block diagram of an example computer system with which or upon which various embodiments of the present invention may be implemented.

With reference now to FIG. 7, portions of the technology for providing a communication composed of computer-readable and computer-executable instructions that reside, for example, in non-transitory computer-readable medium (or storage media, etc.) of a computer system. That is, FIG. 7 illustrates one example of a type of computer that can be used to implement embodiments of the present technology. FIG. 7 represents a system or components that may be used in conjunction with aspects of the present technology. In one embodiment, some or all of the components described herein may be combined with some or all of the components of FIG. 7 to practice the present technology.

FIG. 7 illustrates an example computer system 700 used in accordance with embodiments of the present technology. It is appreciated that computer system 700 of FIG. 7 is an example only and that the present technology can operate on or within a number of different computer systems including general purpose networked computer systems, embedded computer systems, routers, switches, server devices, customer devices, various intermediate devices/artifacts, stand-alone computer systems, mobile devices, personal data assistants, televisions and the like. As shown in FIG. 7, computer system 700 of FIG. 7 is well adapted to having peripheral computer readable media 702 such as, for example, a disk, a compact disc, a flash drive, and the like coupled thereto.

Computer system 700 of FIG. 7 includes an address/data/control bus 704 for communicating information, and a processor 706A coupled to bus 704 for processing information and instructions. As depicted in FIG. 7, computer system 700 is also well suited to a multi-processor environment in which a plurality of processors 706A, 706B, and 706C are present. Conversely, computer system 700 is also well suited to having a single processor such as, for example, processor 706A. Processors 706A, 706B, and 706C may be any of various types of microprocessors. Computer system 700 also includes data storage features such as a computer usable volatile memory 708, e.g., random access memory (RAM), coupled to bus 704 for storing information and instructions for processors 706A, 706B, and 706C.

Computer system 700 also includes computer usable non-volatile memory 710, e.g., read only memory (ROM), coupled to bus 704 for storing static information and instructions for processors 706A, 706B, and 706C. Also present in computer system 700 is a data storage unit 712 (e.g., a magnetic disk drive, optical disk drive, solid state drive (SSD), and the like) coupled to bus 704 for storing information and instructions. Computer system 700 also can optionally include an alpha-numeric input device 714 including alphanumeric and function keys coupled to bus 704 for communicating information and command selections to processor 706A or processors 706A, 706B, and 706C. Computer system 700 also can optionally include a cursor control device 716 coupled to bus 704 for communicating customer input information and command selections to processor 706A or processors 706A, 706B, and 706C. Cursor control device may be a touch sensor, gesture recognition device, and the like. Computer system 700 of the present embodiment can optionally include a display device 718 coupled to bus 704 for displaying information.

Referring still to FIG. 7, display device 718 of FIG. 7 may be a liquid crystal device, cathode ray tube, OLED, plasma display device or other display device suitable for creating graphic images and alpha-numeric characters recognizable to a customer. Cursor control device 716 allows the computer customer to dynamically signal the movement of a visible symbol (cursor) on a display screen of display device 718. Many implementations of cursor control device 716 are known in the art including a trackball, mouse, touch pad, joystick, non-contact input, gesture recognition, voice commands, bio recognition, and the like. In addition, special keys on alpha-numeric input device 714 capable of signaling movement of a given direction or manner of displacement. Alternatively, it will be appreciated that a cursor can be directed and/or activated via input from alpha-numeric input device 714 using special keys and key sequence commands.

Computer system 700 is also well suited to having a cursor directed by other means such as, for example, voice commands. Computer system 700 also includes an I/O device 720 for coupling computer system 700 with external entities. For example, in one embodiment, I/O device 720 is a modem for enabling wired or wireless communications between computer system 700 and an external network such as, but not limited to, the Internet or intranet. A more detailed discussion of the present technology is found below.

Referring still to FIG. 7, various other components are depicted for computer system 700. Specifically, when present, an operating system 722, applications 724, modules 726, and data 728 are shown as typically residing in one or some combination of computer usable volatile memory 708, e.g. random-access memory (RAM), and data storage unit 712. However, it is appreciated that in some embodiments, operating system 722 may be stored in other locations such as on a network or on a flash drive; and that further, operating system 722 may be accessed from a remote location via, for example, a coupling to the internet. In one embodiment, the present technology, for example, is stored as an application 724 or module 726 in memory locations within RAM 708 and memory areas within data storage unit 712. The present technology may be applied to one or more elements of described computer system 700.

Computer system 700 also includes one or more signal generating and receiving device(s) 730 coupled with bus 704 for enabling computer system 700 to interface with other electronic devices and computer systems. Signal generating and receiving device(s) 730 of the present embodiment may include wired serial adaptors, modems, and network adaptors, wireless modems, and wireless network adaptors, and other such communication technology. The signal generating and receiving device(s) 730 may work in conjunction with one (or more) communication interface 732 for coupling information to and/or from computer system 700. Communication interface 732 may include a serial port, parallel port, Universal Serial Bus (USB), Ethernet port, Bluetooth, thunderbolt, near field communications port, WiFi, Cellular modem, or other input/output interface. Communication interface 732 may physically, electrically, optically, or wirelessly (e.g., via radio frequency) couple computer system 700 with another device, such as a mobile device, radio, or computer system.

Computer system 700 is only one example of a suitable computing environment and is not intended to suggest any limitation as to the scope of use or functionality of the present technology. Neither should the computing environment be interpreted as having any dependency or requirement relating to any one or combination of components illustrated in the example computer system 700.

The present technology may be described in the general context of computer-executable instructions, such as program modules, being executed by a computer. Generally, program modules include routines, programs, objects, components, data structures, etc., that perform particular tasks or implement particular abstract data types. The present technology may also be practiced in distributed computing environments where tasks are performed by remote processing devices that are linked through a communications network. In a distributed computing environment, program modules may be located in both local and remote computer-storage media including memory-storage devices.

The foregoing Description of Embodiments is not intended to be exhaustive or to limit the embodiments to the precise form described. Instead, example embodiments in this Description of Embodiments have been presented in order to enable persons of skill in the art to make and use embodiments of the described subject matter. Moreover, various embodiments have been described in various combinations. However, any two or more embodiments may be combined. Although some embodiments have been described in a language specific to structural features and/or methodological acts, it is to be understood that the subject matter defined in the appended claims is not necessarily limited to the specific features or acts described above. Rather, the specific features and acts described above are disclosed by way of illustration and as example forms of implementing the claims and their equivalents.

What is claimed is:

1. A computer-implemented method comprising:
receiving, at a store's customer credit application computer, an application for a new account, the application comprising a contact information for a customer's mobile device and applicant information about said customer, wherein said contact information for said customer's mobile device is provided via a device-to-device communication between said customer's mobile device and said store's customer credit application computer;
providing, from the store's customer credit application computer, the contact information for the customer's mobile device to a verification system to authenticate the customer's mobile device;
providing, from a credit account provider, a text to the customer's mobile device, the text causing the customer's mobile device to be subjected to a second authentication;
receiving, at the customer's mobile device and after a completion of said second authentication, a message that includes a download link for a digital pass, said digital pass comprises:
a scannable code; and
an animated digital watermark to be presented on a display of said customer's mobile device when said digital pass is utilized, wherein a touch of said animated digital watermark on said display causes a visual message to be displayed on said display, said visual message to provide evidence that said digital pass on said display is not a fraudulent captured video of said digital pass on said display; and utilizing the download link to receive the digital pass at a mobile wallet of the customer's mobile device.

2. The computer-implemented method of claim 1, further comprising:

receiving said applicant information about said customer from said customer, wherein said information is received via said customer entering said information via said customer's mobile device.

3. The computer-implemented method of claim 1, further comprising:

receiving said applicant information about said customer from a device-to-device interaction between the store's customer credit application computer and the customer's mobile device.

4. The computer-implemented method of claim 1, further comprising:

receiving said applicant information about said customer from a customer specific information engine using a device identifier or a user identifier.

5. The computer-implemented method of claim 1, further comprising:

providing a telephone number of the customer's mobile device as the contact information for the customer's mobile device.

6. The computer-implemented method of claim 1, further comprising:

receiving a device identifier for the customer's mobile device; and determining from the device identifier via a customer specific information engine, the contact information for the customer's mobile device.

7. The computer-implemented method of claim 1, further comprising:

including a second authentication link in the text to the customer's mobile device; and selecting the second authentication link causes the customer's mobile device to access a customer specific information engine that performs the second authentication of the customer's mobile device.

8. The computer-implemented method of claim 1, further comprising:

after receiving the download link, using a device-to-device communication between the customer's mobile device and the store's customer credit application computer to receive the digital pass at said mobile wallet of the customer's mobile device.

9. A non-transitory computer-readable storage medium having instructions embodied therein that when executed cause a computer system to perform a method comprising:

receiving, at a store's customer credit application computer, an application for a new account, the application comprising a contact information for a customer's mobile device and applicant information about said customer and a contact information for a customer's mobile device, wherein said contact information for said customer's mobile device is provided via a device-to-device communication between said customer's mobile device and said store's customer credit application computer;

providing, from the store's customer credit application computer, the contact information for the customer's mobile device to a verification system to authenticate the customer's mobile device;

providing, from a credit account provider, a text to the customer's mobile device, the text causing the customer's mobile device to be subjected to a second authentication;

receiving, at the customer's mobile device and after a completion of said second authentication, a message that includes a download link for a digital pass, said digital pass comprises:

a scannable code; and an animated digital watermark to be presented on a display of said customer's mobile device when said digital pass is utilized, wherein a touch of said animated digital watermark on said display causes a visual message to be displayed on said display, said visual message to provide evidence that said digital pass on said display is not a fraudulent captured video of said digital pass on said display; and utilizing the download link to receive the digital pass at a mobile wallet of the customer's mobile device.

10. The non-transitory computer-readable storage medium of claim 9, further comprising:

receiving said applicant information about said customer from said customer, wherein said information is received via said customer entering said information via said customer's mobile device.

11. The non-transitory computer-readable storage medium of claim 9, further comprising:

receiving said applicant information about said customer from a device-to-device interaction between the store's customer credit application computer and the customer's mobile device.

12. The non-transitory computer-readable storage medium of claim 9, further comprising:

receiving said applicant information about said customer from a customer specific information engine using a device identifier or a user identifier.

13. The non-transitory computer-readable storage medium of claim 9, further comprising:

providing a device identifier for the customer's mobile device; and determining from the device identifier via a customer specific information engine, the contact information for the customer's mobile device.

14. The non-transitory computer-readable storage medium of claim 9, further comprising:

including a second authentication link in the text to the customer's mobile device; and selecting the second authentication link causes the customer's mobile device to access a customer specific information engine that performs the second authentication of the customer's mobile device.

15. The non-transitory computer-readable storage medium of claim 9, further comprising:

after receiving the download link, using a device-to-device communication between the customer's mobile device and the store's customer credit application computer to receive the digital pass at said mobile wallet of the customer's mobile device.

16. A non-transitory computer-readable medium for storing instructions, the instructions comprising:

one or more instructions which, when executed by one or more processors of a store's customer credit application computer, cause the one or more processors to:

receive an application for a new account, the application comprising a contact information for a customer's mobile device and applicant information about said customer, wherein said contact information for said customer's mobile device is provided via a device-to-device communication between said customer's mobile device and said store's customer credit application computer;
provide the contact information for the customer's mobile device to a verification system to authenticate the customer's mobile device; and
one or more instructions which, when executed by one or more processors of the customer's mobile device, cause one or more processors to:
receive a text from a credit account provider, the text causing the customer's mobile device to be subjected to a second authentication;
receive, after a completion of said second authentication, a message that includes a download link for a digital pass digital pass, said digital pass comprising:
a scannable code; and
an animated digital watermark to be presented on a display of said customer's mobile device when said digital pass is utilized, wherein a touch of said animated digital watermark on said display causes a visual message to be displayed on said display, said visual message to provide evidence that said digital pass on the display is not a fraudulent captured video of said digital pass on said display; and
utilize the download link to receive the digital pass at a mobile wallet of the customer's mobile device.

17. The non-transitory computer-readable medium of claim 16, where the instructions further comprising:
one or more instructions which, when executed by one or more processors of a customer specific information engine, cause the one or more processors to:
utilize a device ID to perform a proprietary database search for authentication information for the customer's mobile device;
utilize a user ID to perform the proprietary database search for authentication information for the customer's mobile device; or
utilize the device ID and the user ID to perform the proprietary database search for authentication information for the customer's mobile device.

18. The non-transitory computer-readable medium of claim 17, where the one or more instructions further cause the one or more processors of the customer specific information engine to:
utilize a confidence factor threshold to authenticate said customer's mobile device, such that only authentication information about the customer's mobile device that is above said confidence factor threshold is utilized to authenticate the customer's mobile device.

* * * * *